(12) United States Patent
Vinson et al.

(10) Patent No.: US 11,748,717 B2
(45) Date of Patent: Sep. 5, 2023

(54) SYSTEMS AND METHODS FOR DISTRIBUTING PERSONALLY IDENTIFIABLE INFORMATION ACROSS GEOGRAPHIC BOUNDARIES

(71) Applicant: MoneyGram International, Inc., Minneapolis, MN (US)

(72) Inventors: Yale P. Vinson, Flower Mound, TX (US); Bart S. van Hoek, Dallas, TX (US)

(73) Assignee: MoneyGram International, Inc., Dallas, TX (US)

( * ) Notice: Subject to any disclaimer, the term of this patent is extended or adjusted under 35 U.S.C. 154(b) by 0 days.

(21) Appl. No.: 17/475,849

(22) Filed: Sep. 15, 2021

(65) Prior Publication Data
US 2022/0129899 A1    Apr. 28, 2022

Related U.S. Application Data

(63) Continuation of application No. 16/268,467, filed on Feb. 5, 2019, now abandoned.

(51) Int. Cl.
*G06Q 20/08* (2012.01)
*G06Q 20/02* (2012.01)
(Continued)

(52) U.S. Cl.
CPC ..... *G06Q 20/0855* (2013.01); *G06F 21/6245* (2013.01); *G06Q 20/02* (2013.01);
(Continued)

(58) Field of Classification Search
CPC ........... G06Q 20/0855; G06Q 20/4015; G06Q 20/6245; G06Q 20/02; G06Q 20/363
See application file for complete search history.

(56) References Cited

U.S. PATENT DOCUMENTS 10,096,006 B2    10/2018 Loevenguth et al.
10,528,966 B2 *    1/2020 Keller ............... G06Q 30/0235
(Continued)

FOREIGN PATENT DOCUMENTS

| WO | 2018100371 A1 | 6/2018 |
| WO | 2018145195 A1 | 8/2018 |
| WO | 2018201237 A1 | 11/2018 |

OTHER PUBLICATIONS

Anonymous: "Tokenization (data security)—Wikipedia," Jan. 15, 2016, XP055665803; retrieved from the Internet https://en.wikipedia.org/w/index.php?title=Tokenization_(data_security)&oldid=699919409 (retrieved Feb. 6, 2020).
(Continued)

*Primary Examiner* — Jacob C. Coppola
*Assistant Examiner* — Terry Nathan Murray
(74) *Attorney, Agent, or Firm* — Law Office of Bill Naifeh

(57) ABSTRACT

Systems, methods, and computer-readable storage media configured to facilitate execution of transactions via a money transfer network are disclosed. During execution of the transactions, tokenized identity information may be utilized when exchanging transaction data between geographically distributed nodes of the money transfer network and the transactions are recorded to a distributed ledger maintained by the nodes. Smart contracts may be utilized to digitally sign transactions at various stages of transaction processing, such as at different stages of regulatory compliance validation and to authenticate the validity of the requested transaction (e.g., prevent double-spends). Utilizing tokenized identity information may reduce the likelihood that personally identifiable information (PII data) is obtained by or inadvertently provided to unauthorized third parties or systems. Additionally, the distributed ledger may record information in immutable records, thereby increasing the
(Continued)

reliability and trustworthiness (e.g., for auditing purposes) of the data stored on the distributed ledger.

22 Claims, 9 Drawing Sheets

(51) Int. Cl.
*G06Q 20/38* (2012.01)
*G06Q 20/36* (2012.01)
*G06Q 20/40* (2012.01)
*G06F 21/62* (2013.01)

(52) U.S. Cl.
CPC ....... *G06Q 20/363* (2013.01); *G06Q 20/3676* (2013.01); *G06Q 20/389* (2013.01); *G06Q 20/3821* (2013.01); *G06Q 20/38215* (2013.01); *G06Q 20/405* (2013.01); *G06Q 20/4015* (2020.05)

(56) References Cited

U.S. PATENT DOCUMENTS

| | | | |
|---|---|---|---|
| 2009/0089113 | A1 | 4/2009 | Rousso et al. |
| 2013/0317893 | A1 | 11/2013 | Nelson et al. |
| 2014/0024354 | A1 | 1/2014 | Haik et al. |
| 2015/0348038 | A1* | 12/2015 | Femrite ............. G06Q 20/4014 705/44 |
| 2017/0018029 | A1 | 1/2017 | Eiriz et al. |
| 2017/0237554 | A1 | 8/2017 | Jacobs et al. |
| 2017/0366348 | A1 | 12/2017 | Weimer et al. |
| 2018/0096752 | A1 | 4/2018 | Ovalle |
| 2018/0247302 | A1 | 8/2018 | Armstrong et al. |
| 2018/0293554 | A1 | 10/2018 | Johnson |
| 2019/0318424 | A1 | 10/2019 | McWilliams et al. |
| 2020/0005295 | A1* | 1/2020 | Murphy ............... G06Q 20/405 |
| 2020/0005310 | A1* | 1/2020 | Kumar .................. G06Q 40/00 |
| 2020/0111066 | A1* | 4/2020 | Anstey ................. H04L 67/104 |
| 2020/0120144 | A1* | 4/2020 | Yadav ............... G06Q 20/4016 |
| 2020/0250633 | A1* | 8/2020 | Vinson ................ G06Q 20/405 |

OTHER PUBLICATIONS

Final Office Action, dated Jun. 15, 2021, by the USPTO, re U.S. Appl. No. 16/268,467.

International Search Report and Written Opinion, dated May 7, 2020, by the ISA/US, re PCT/US2020/016734.

Office Action, dated Dec. 22, 2020, by the USPTO, re U.S. Appl. No. 16/268,467.

Supplemental Search Report, dated May 6, 2021, by the ISA/EP, re PCT/US2020/016734.

* cited by examiner

SYSTEMS AND METHODS FOR DISTRIBUTING PERSONALLY IDENTIFIABLE INFORMATION ACROSS GEOGRAPHIC BOUNDARIES

CROSS-REFERENCE TO RELATED APPLICATION

This application is related to commonly owned U.S. patent application Ser. No. 16/268,467, filed Feb. 5, 2019, entitled "SYSTEMS AND METHODS FOR PROVIDING DISTRIBUTED LEDGER TECHNOLOGY-BASED TRANSACTIONS," the disclosure of which is hereby incorporated by reference in its entirety.

TECHNICAL FIELD

The present application relates to distributed ledger technology and more specifically to systems and methods for utilizing distributed ledger technology to secure user data during execution of money transfer transactions.

BACKGROUND

With the proliferation of identity and other forms of data theft, protection of personally identifiable information (hereinafter referred to as "PII data") has become a primary concern for many businesses, individuals, and governments. Various approaches have been taken to address and mitigate data theft. For example, encryption of PII data is one potential solution to mitigate certain types of data theft. However, encryption alone is not viable option because the data may be decrypted by an authorized system or user and such access may be inadvertently exposed to threats (e.g., inadvertent distribution of the data to an unauthorized system or user, capture of the decrypted data by a malicious user, such as through transmission of the decrypted data over a network, etc.). To further complicate matters, many governments have imposed regulations regarding the handling of PII data and improper disclosure of such data, whether intentional or not, may impose significant financial burdens (e.g., fines, etc.) on an entity, as well as cause harm to the entity's relationship with their customers.

BRIEF SUMMARY

The present application discloses systems, methods, and computer-readable storage media configured to facilitate execution of transactions via a money transfer network. The money transfer network may include a plurality of geographically distributed nodes deployed across various geographic regions (e.g., the United States, the United Kingdom, China, Mexico, Australia, etc.). Additionally, the plurality of geographically distributed nodes may include nodes of different types. For example, the plurality of geographically distributed nodes may include transaction nodes, notary nodes, observer nodes, and oracle nodes. Each of these different types of nodes may perform different operations with respect to facilitating transactions via the money transfer network, such as validating aspects of transactions, auditing transactions, and the like. It is noted that the geographic distribution of the nodes may not be uniform—that is, some types of nodes may be more prevalent than other types of nodes (e.g., at least one transaction node may be deployed in each geographic location served by the money transfer network, while the other nodes may be less widely deployed and may serve multiple geographic areas).

When users register with the money transfer network, PII data may be collected from the users. The PII data may be stored in a user database maintained by a node (e.g., a transaction node) of the money transfer network. During registration, the user's identity may be tokenized and the tokenized identity may be utilized for executing transactions. For example, during processing of a transaction, the tokenized identities of the participants to the transaction may be exchanged between different geographically distributed nodes. Each of the geographically distributed nodes may be configured to perform certain operations to validate the transaction for execution and completion via the money transfer network. The transactions may be recorded to a distributed ledger maintained by the nodes (e.g., transaction nodes). Because the transaction records stored on the distributed ledger contain tokenized identity data, the transaction records may be accessed and distributed across various geographic locations without risk of PII data associated with users being obtained by a third party entity or system. Additionally, the distributed ledger may record information immutably, thereby increasing the reliability and trustworthiness (e.g., for auditing purposes) of the data stored on the distributed ledger. In embodiments, smart contracts may be utilized to digitally sign transactions at various stages of processing, such as at different stages of regulatory compliance validation and to authenticate the validity of the requested transaction (e.g., prevent double-spends).

The foregoing has outlined rather broadly the features and technical advantages of the present invention in order that the detailed description that follows may be better understood. Additional features and advantages will be described hereinafter which form the subject of the claims. It should be appreciated by those skilled in the art that the conception and specific embodiment disclosed may be readily utilized as a basis for modifying or designing other structures for carrying out the same purposes of the present application. It should also be realized by those skilled in the art that such equivalent constructions do not depart from the spirit and scope of the application as set forth in the appended claims. The novel features which are believed to be characteristic of embodiments described herein, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present embodiments.

BRIEF DESCRIPTION OF THE DRAWINGS

For a more complete understanding, reference is now made to the following descriptions taken in conjunction with the accompanying drawings, in which.

DETAILED DESCRIPTION

Figure 1:
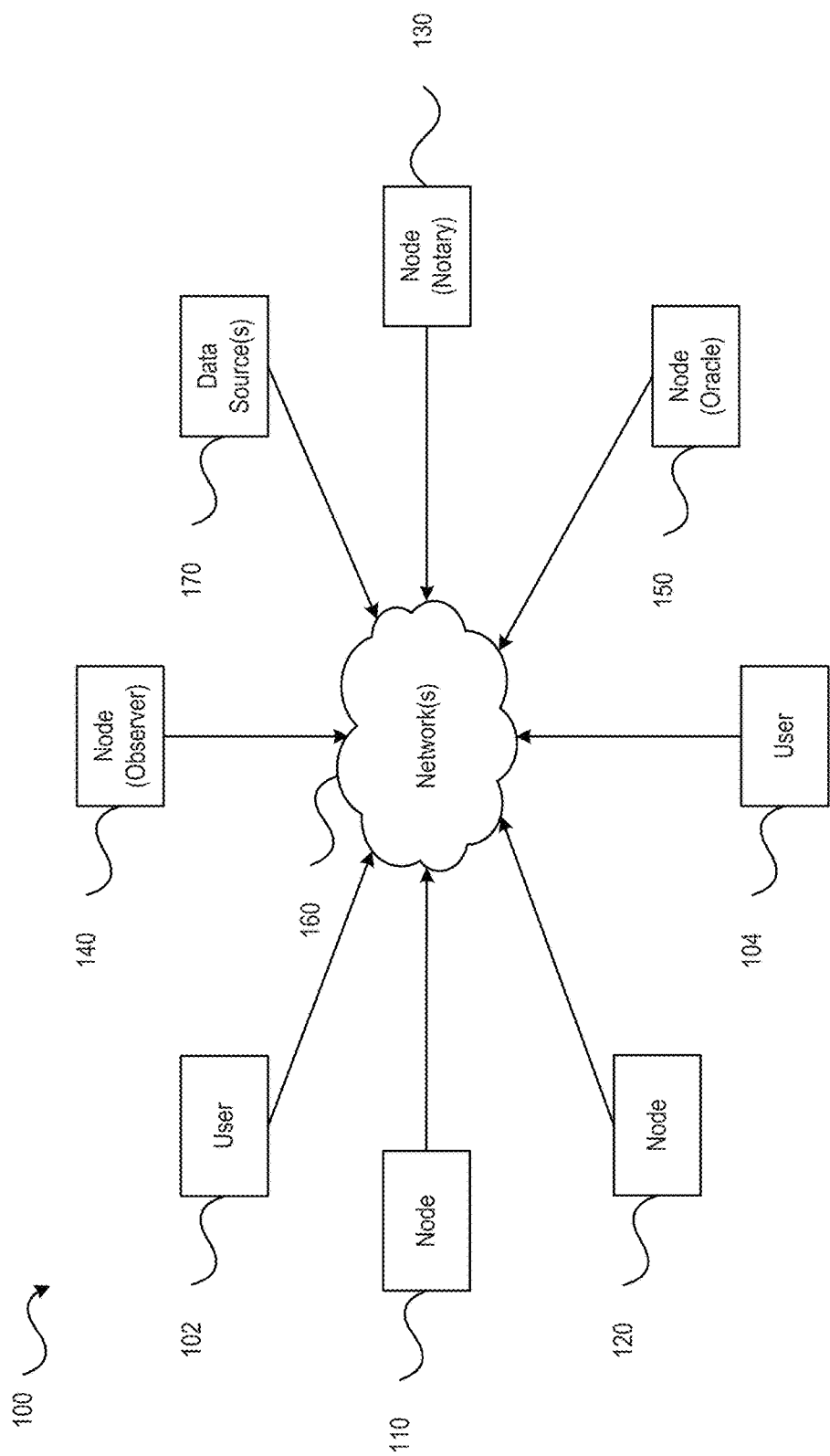
FIG. 1 is a block diagram illustrating an exemplary money transfer network configured in accordance with embodiments of the present disclosure.

Referring to FIG. 1, a block diagram illustrating an exemplary money transfer network configured in accordance with embodiments of the present disclosure is shown as a money transfer network 100. The money transfer network 100 may utilize distributed ledger technology to facilitate various types of transactions (e.g., money transfer transactions, loan fund distribution and repayment transactions, bill payment transactions, and the like). As described herein, the money transfer network 100 may be configured to utilize a distributed ledger to facilitate the various types of transactions while maintaining personally identifiable information (hereinafter referred to as "PII data") in a secure manner.

As shown in FIG. 1, the money transfer network 100 may include a plurality of nodes (e.g., nodes 110, 120, 130, 140, 150). The plurality of nodes may include different types of nodes, such as transaction nodes (e.g., nodes 110, 120), notary nodes (e.g., node 130), observer nodes (e.g., node 140), and oracle nodes (e.g., node 150). Each of the different types of nodes may be configured to execute operations to facilitate various portions of a money transfer transaction. For example, transaction nodes may be configured to perform operations with respect to interacting with users (e.g., user registration, receiving money transfer transaction requests, updating records stored in the distributed ledger, and the like); notary nodes may be configured to evaluate transactions and ensure consensus of the distributed ledger and/or nodes with respect to transactions, such as to prevent multiple uses of a digital asset or other resource of the money transfer network, and validate transactions; observer nodes may be configured to monitor activity of the money transfer network, such as for auditing or regulatory purposes; and oracle nodes may be configured to obtain external information (e.g., foreign currency exchange rates, interest rates, etc.) in connection with validating a transaction executed on the money transfer network 100 or for other reasons.

Each of the different types of nodes of the money transfer network 100 may have different rights or permissions with respect to accessing information stored on the distributed ledger. For example, transaction nodes may be associated with rights or permissions that enable the transaction nodes to modify records stored in the distributed ledger, such as to record new transactions, while observer nodes may have rights or permissions that enable the observer nodes to view and/or receive information associated transactions recorded to the distributed ledger, but may not have rights or permissions that enable the observer nodes to participate in updating the distributed ledger. Observer nodes may also have the rights/permissions to obtain user PII information if suspicious activity is detected, or when mandated by a governing body (e.g., US government, FinCen, etc.). Notary nodes may have the rights/permissions to evaluate the transaction history back to the initial creator of the assets. It is noted that the exemplary rights and permissions described above have been provided for purposes of illustration, rather than by way of limitation and that the money transfer networks operating in accordance with embodiments of the present disclosure may be configured to utilize other types of rights and permissions to control operations of the various nodes operating within the money transfer network 100.

In accordance with embodiments, the distributed nature of the ledger utilized by the money transfer network 100 may be realized, at least in part, through the distribution of the plurality of nodes of the money transfer network 100 across a plurality of geographic areas. To illustrate, transaction nodes may be deployed in a variety of countries, such as the United States, the United Kingdom, France, Australia, China, and the like. As explained above, the transaction nodes may be configured with rights or permissions that enable the transactions nodes to update the distributed ledger. In such instances, portions of the distributed ledger may be created, maintained, and updated by each of the geographically distributed transaction nodes, resulting in those portions of the distributed ledger also being geographically distributed. Stated another way, each of the geographically distributed transaction nodes may be configured to store a portion of the distributed ledger in a data store or memory residing with the specific geography where the corresponding transaction node is located. For example, a transaction node located in the United States may be configured to maintain its portion of the distributed ledger in a data store or memory located within the United States while a transaction node located in France may be configured to maintain its portion of the distributed ledger in a data store or memory located within France. It is to be understood that although FIG. 1 only illustrates two transaction nodes (e.g., nodes 110, 120), the money transfer network 100 may include more than two transaction nodes in accordance with embodiments of the present disclosure. Further, it is noted that multiple transaction nodes may be distributed across a single geographic area, such as deploying multiple transaction nodes within the United States, which may facilitate enhanced performance with respect to processing transactions. For example, reduced latency may be realized by having a transaction initiated in New York be handled by a transaction node on the east coast of the United States instead by a transaction node located on the west coast. Although the geographic distribution of nodes described above refers to distribution of nodes within different countries, embodiments are not limited to such a distribution. For example, nodes may be distributed across defined geographic regions, which may be specific to a particular country (e.g., the United States) or may span multiple countries (e.g., the United States, Canada, and Mexico).

It is noted that although the example described above is directed to illustrating geographic distribution of transaction nodes, other types of nodes (e.g., notary nodes, observer nodes, and oracle nodes) may also be geographically distributed in accordance with embodiments. For example, notary nodes, observer nodes, and oracle nodes may also be distributed across the geographies where transaction nodes are deployed. However, the particular number and/or type of nodes deployed in a particular geography may vary depending on the configuration of the money transfer network 100. To illustrate, one or more transaction nodes may be deployed in each of a plurality of countries (e.g., the United States, France, the United Kingdom, Germany, South Africa, Australia, Mexico, and China). In one exemplary configuration of the money transfer network 100, one or more observer nodes, one or more notary nodes, and one or more oracle nodes may also be deployed in each of the plurality of countries. In an additional or alternative configuration of the money transfer network 100, a single observer node, notary node, and oracle node may be utilized to serve all of the geographically distributed transaction nodes. In still another additional or alternative configuration of the money transfer network, one or more oracle nodes, notary nodes, and/or observer nodes may be deployed in some, but not all, of the plurality of countries. In such instances at least one of the oracle nodes, notary nodes, and/or observer nodes may be configured to serve transaction nodes in multiple countries. For example, suppose transaction nodes were deployed in the United Kingdom, Germany, and France. An oracle node located in Germany may be configured to serve transaction nodes in France and the United Kingdom; an observer node located in France may be configured to serve the transaction nodes in the United Kingdom, Germany, and France; a notary node located in the United Kingdom may be configured to serve transaction nodes in the United Kingdom, while another notary node located in France may be configured to serve transaction nodes in both France and Germany. It is noted that the exemplary deployments of nodes described above has been provided for purposes of illustration, rather than by way of limitation, and that other arrangements and deployments of the various types of nodes may be utilized to facilitate operations of a money transfer network in accordance with embodiments of the present disclosure. For example, one or more types of network nodes, such as oracle nodes, may be omitted from some configurations of a money transfer network configured in accordance with embodiments of the present disclosure. By distributing the different types of nodes across different geographies and utilizing a distributed ledger to facilitate various types of transactions, the transactions may be executed without requiring knowledge or use of PII data. This minimizes the potential for such data to be obtained by or inadvertently disclosed to unauthorized users and systems, as described in more detail below.

Figure 2:
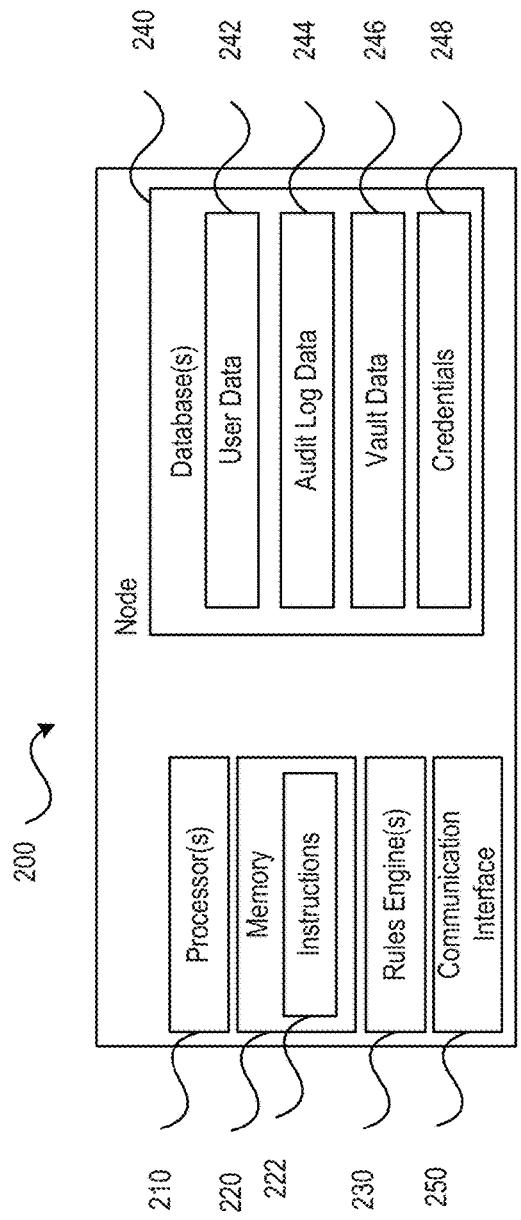
FIG. 2 is a block diagram illustrating an exemplary architecture for a node of a money transfer network in accordance with embodiments of the present disclosure.

Referring briefly to FIG. 2, a block diagram illustrating an exemplary architecture for a node of a money transfer network in accordance with embodiments of the present disclosure is shown as node 200. It is noted that the node architecture illustrated in FIG. 2 is intended to illustrate exemplary aspects of a node deployed within a money transfer network configured in accordance with embodiments of the present disclosure and that the particular configuration of different types of nodes may vary, as described in more detail below.

As shown in FIG. 2, an exemplary node of a money transfer network configured in accordance with embodiments of the present disclosure may include one or more processors 210, a memory 220, one or more rules engines 230, one or more databases 240, and one or more communication interfaces 250. The one or more processors 210 may include a central processing unit (CPU) which may include one or more processing cores. The memory 220 may include read only memory (ROM) devices, random access memory (RAM) devices, one or more hard disk drives (HDDs), one or more flash memory devices, one or more solid state drive (SSDs), other devices configured to store data in a persistent or non-persistent state, or a combination of different memory devices. The memory 220 may store instructions 222 that, when executed by the one or more processors 210, cause the one or more processors 210 to perform the operations of one of the exemplary types of nodes described herein with respect to FIGS. 1-10. Although not explicitly illustrated in FIG. 2, in an embodiment, the memory 220 may store at least one of the one or more databases 240. As described above with respect to FIG. 1, the node 200 may be part of a network.

To facilitate network communication between the node 200 and other nodes of the money transfer network 100, the communication interface 250 may be configured to communicatively couple the node to one or more other nodes via one or more wired or wireless communication links established according to one or more communication protocols (e.g., a transmission control protocol/internet protocol (TCP/IP), an institute of electrical and electronics engineers (IEEE) 802.11 protocol, and an IEEE 802.16 protocol, a 3rd generation (3G) protocol, a 4th generation (4G)/long term evolution (LTE) protocol, etc.). In an aspect, the communication links established between nodes of the money transfer network 100 may be established for a peer-to-peer network. In an additional or alternative aspect, the money transfer network 100 may be facilitated via one or more network types established according to one or more network types (e.g., local area networks (LANs), a wide area networks (WANs), wireless WANs, wireless LANs (WLANs), a metropolitan area networks (MANs), wireless MANs network, cellular data networks, cellular voice networks, the Internet, or a combination of these different networks. It is noted that the protocols and network types described herein have been provided for purposes of illustration, rather than by way of limitation and that money transfer networks operating in accordance with embodiments of the present disclosure may be configured to utilize other types of networks and protocols to facilitate communications between different nodes and components of the money transfer network.

The one or more rules engines 230 may be configured to facilitate various operations with respect to transactions and operations of the money transfer network. For example, a rules engine may be configured to validate a requested transaction with respect to aggregation rules, interdiction rules, and the like. Validation of a transaction with respect to aggregation rules may include evaluating whether a party to the transaction has participated in multiple transactions during a time period (e.g., a day, three days, a week, a month, etc.) that in total exceed a threshold value (e.g., $10,000). Aggregation verification may be configured to identify instances of potential violations of one or more regulatory requirements, such as regulatory requirements imposed by the Office of Foreign Asset Control (OFAC) or another regulatory agency. A rules engine implementing rules with respect to verifying compliance with one or more interdiction rules may be configured to verify that a party to the transaction is not identified on a list of excluded individuals (e.g., individuals that are not permitted to participate in transactions facilitated via the money transfer network). In an aspect, one or more of the rules engines 230 may be configured to operate on tokenized identity data with respect to transactions. Aspects of utilizing tokenized identifies are described in more detail below.

The one or more databases 240 may include various types of databases depending on the particular type of node and configuration of the money transfer network 100. As shown in FIG. 2, the one or more databases 240 may include a user data database 242, an audit log data database 244, a vault data database 246, and a credentials database 248. The user data database 242 may be configured to store information about one or more users registered with a money transfer service provider operating the money transfer network 100. For example, user data database 242 may be configured to store user information, such as a registered user's name, address, telephone number, e-mail address, social security number, driver license number, another type of identifier (e.g., another type of government issued identification document, such as a passport number), date of birth, username (e.g., an identifier utilized by the user to access the services provided by the money transfer network, such as via a mobile application or website), or other information associated with the user. Some of the aforementioned user data may be considered PII data, such as the user's name, address, social security number, driver license number, date of birth, etc. The user data may be encrypted when stored in the user database 242. For example, the user data may be encrypted using any modern symmetric encryption method such as the Advanced Encryption Standard (AES) or another similar encryption technique.

The audit log database 244 may store information associated with audits of transactions facilitated by the money transfer network 100. The audit log database may include records associated with internal audits, such as audits initiated by the operator of the money transfer network 100 for internal or regulatory compliance validation. Additionally or alternatively, the audit log database 244 may include records associated with external audits, such as audits initiated by or prepared for external entities (e.g., government agencies, third party regulatory compliance verification providers, and the like). External audits may be utilized to verify compliance with various laws and regulations imposed on the entity operating the money transfer network 100, such as proving compliance with government imposed regulations to a government agency.

The vault database 246 may store records associated with transactions executed over the money transfer network 100. For example, each user that registers with the entity operating the money transfer network 100 may be associated with a vault. When the user participates in a transaction facilitated by the network 100, a record in the user's corresponding vault may be created. In accordance with the present disclosure, when the user registers with a provider or operator of the money transfer network 100, a token representative of the user (or the user's data) may be generated. Transactions recorded to the user's vault may record the user's identity using the user's tokenized identity, rather than recording actual user data (e.g., PII data). By separating the user's PII data (e.g., records recorded in the user database 242) from records associated with transactions the user participated in (e.g., records recorded in the vault database 246), the transaction records may be accessed without risking exposure of PII data (e.g., because the transaction records include the user's tokenized identity). Additional aspects of utilizing tokenized identities to facilitate transactions via the money transfer network 100 are described below.

The credentials database 248 may store rights and permissions data associated with the node 200. The particular rights and permissions of the node 200 may depend on what type of node the node 200 is. Additional aspects of rights and permissions that may be utilized by nodes in accordance with embodiments of the present disclosure are described in more detail below. In an embodiment, the money transfer network may be a permissioned network and may require appropriate credentials to be provided and authenticated prior to adding one or more additional nodes the money transfer network. For example, the money transfer network 100 may be configured to leverage other business partners operating on the same or a different network, meaning that the nodes in the money transfer network 100 can interface with nodes from entities that provide identification and verification (ID&V) services, know your customer (KYC) services, settlement services, or other services utilized to facilitate operations of the money transfer network 100. Additionally, the nodes of the money transfer network 100 may be configured to enable services to one or more external entities, such as business partners and other entities that utilize services provided by the money transfer network 100. As an example, a company (e.g., an insurance company or other entity) may utilize the features and services provided by the money transfer network 100 to provide a pay-out service whereby payments are facilitated via the money transfer network 100 in accordance with the present disclosure.

It is to be understood that the exemplary components of the node 200 have been provided by way of illustration, rather than by way of limitation. In embodiments, not all node types will include every component illustrated in FIG. 2. For example, as explained above, transaction nodes are configured to modify and/or update the distributed ledger. Accordingly, user database 242 and vault database 246 may only be present in transaction nodes. On the other hand, observer nodes may include vault database 246 but not user database 242. Because the vault database 246 does not include PII data, observer nodes may be deployed across the geographic areas served by the money transfer network 100 in a less restrictive manner. This is because regulatory requirements in some geographic areas may restrict the operator of the money transfer network 100 from distributing PII data outside a specific geographic area. To illustrate, suppose that PII data is stored in a user database 242 associated with a transaction node in France and regulatory requirements in France restrict an operator of the money transfer network 100 from distributing the PII data to entities or systems outside of France. Because the vault database 246 does not include PII data, the records stored in the vault of the transaction node located in France may be distributed to an observer node in France or another country without violating the aforementioned regulatory requirements. Additional aspects of the types of information that may be stored in different types of nodes in accordance with embodiments are described in more detail below.

As briefly described above and referring back to FIG. 1, the money transfer network 100 may be configured facilitate transactions between different users. For example, a first user 102 may initiate a money transfer transaction to transfer funds to a second user 104. The first user may be located in a first geographic location (e.g., the United States) and the second user may be located in a second geographic location (e.g., Mexico). To initiate the transaction, the first user 102 may access an application executing on the first user 102's electronic device (e.g., smartphone, a tablet computing device, a personal digital assistance (PDA), a desktop computing device, a laptop computing device, and the like). The application may be a mobile application configured to be executed on the first user 102's smartphone or tablet computing device, an application configured to be executed on the first user 102's desktop or laptop computing device, or a browser-based application configured to facilitate access to the money transfer network 100 via a web browser.

The application may be configured to authenticate the first user 102 requesting to initiate a transaction via the money transfer network 100. Upon successful authentication, the application may be configured to present one or more graphical user interfaces (GUIs) that enable the first user 102 to configure the transaction. During configuration of the transaction, the first user 102 may provide inputs regarding the amount of the transaction (e.g., an amount of funds to be transferred to the second user 104), information regarding the second user 104 (e.g., the user's name), a location associated with the second user 104 (e.g., a location where the second user 104 resides or is to receive the funds associated with the transaction), service level information (e.g., a type of transaction being initiated, a time frame for delivering the funds to the second party 104, etc.), other information, or a combination of the aforementioned types of information. It is noted that although the exemplary process for configuring a money transfer transaction via an application has been described above, money transfer transactions may also be configured by money transfer agents. For example, the money transfer service provider may operate numerous retail store locations where money transfer agents are present to assist customers with the configuration of money transfer transactions. In such situations, each of the retail store locations (e.g., money transfer agent locations) may include one or more agent devices (e.g., laptop computing devices, tablet computing devices, kiosks, desktop computing devices, point of sale systems, and the like) that include an application for configuring money transfer transactions, such as to receive inputs via one or more input/output devices (e.g., keyboards, financial card readers, a mouse, touchscreen display devices, printers, and the like) providing information regarding a sending party, a receiving party, a send amount, a funding amount, and the like. Accordingly, it is to be understood that embodiments of the present disclosure may enable users to configure money transfer transactions autonomously (e.g., without assistance of a money transfer agent) via an application executing on a user device or at a kiosk provided by the money transfer service provider or to configure money transfer transactions with the assistance of a money transfer agent. Further, it is noted that money transfer agent locations may be dedicated money transfer agent locations, such as retail locations operated by the money transfer service provider, or may be incorporated into retail locations operated by third party entities, such as a grocery store, a pharmacy, a convenience store, and the like, authorized to provide money transfer transactions via the money transfer network 100.

Once the information for configuring the transaction has been provided via the one or more GUIs, the application may provide the request to a node of the money transfer network 100. For example, the node 110 may be located in the United States and the node 120 may be located in Mexico. Because the first user 102 is located in the United States, the transaction data received via the application may be provided to the node 110. Upon receiving the transaction data, the node 110 may be configured to validate that the second user 104. In an embodiment, the node 110 may determine whether the second user 104 is a local user (e.g., a user located in the United States) or a remote or foreign user (e.g., a user located outside of the United States). In an aspect, the node 110 may be configured to determine whether the second user 104 is a local user or a remote/foreign user based on information included in the transaction data received from the first user 102, such as the location information associated with the second user 104. In an additional or alternative aspect, the determination of whether the second user 104 is a local or remote/foreign user may be based on information stored in a database of the node 110, such as whether the second user 104 is identified in the user database 242. In an embodiment, both the location information associated with the second user 104 and the information stored in the database may be utilized to determine whether the second user 104 is a local or remote/foreign user. For example, multiple users registered with the money transfer network 100 may have the same name. By utilizing both the transaction data (e.g., the location information associated with the second user 104) and the database data, the node 110 may more accurately determine whether a user is a local user or a remote/foreign user. To illustrate, if the database includes one or more users having the same name as the second user 104, but the location data included in the transaction data indicates a location outside of the United States, the node 110 may determine that the user is a remote user.

When the second user is determined to be a remote user, the node 110 may transmit information to a second node located in the geographic region corresponding to the location of the second user 104, such as the node 120. Upon receiving the information from the node 110, the node 120 may determine whether the second user 104 is a local user or a remote/foreign user with respect to the geographic region associated with the node 120, as described above. In this example, the node 120 may determine the second user 104 is a local user and may facilitate further operations for processing the transaction. For example, once the second user 104 is determined to be a registered user, the second node 120 may transmit information associated with a tokenized identity of the second user 104 to the node 110. The second node 120 may also transmit information regarding the transaction details, which may include information such as a transaction amount, a currency type, one or more timestamps, fees, and currency exchange rate information, and the like. Additionally, the first node 110 and/or the second node 120 may provide risk scoring information associated with the sender's identity, the receiving party's identity, or both. The node 110 and/or the second node 120 may obtain the risk score information from an external service based on the tokenized identity or may determine the risk score information using a rules engine (e.g., one of the rules engines 230 of FIG. 2) configured to evaluate risk based on a user's identity and/or other information (e.g., historical transactions the user(s) have participated in, a corridor associated with the transaction, whether a particular user has participated in transactions originating from or terminating at a location associated with the transaction under consideration, and the like).

Upon receiving the tokenized identity information associated with the second user 104 from the node 120, the node 110 may initiate additional processing of the transaction. The additional processing may include generating a transaction identifier for the transaction. In an embodiment, the transaction identifier may be generated when the transaction is initially configured (e.g., prior to determining whether the second user 104 is a local or foreign/remote user), rather than after the second user 104 information is verified by the node 120. Additionally, the processing may include executing one or more rules engines (e.g., the one or more rules engines 230 of FIG. 2) against the transaction data to determine whether the transaction is authorized for completion. As explained above, the one or more rules engines may be configured to verify the transaction does not violate aggregation rules, interdiction rules, and the like. The execution of the one or more rules by the node 110 may be configured to evaluate whether the transaction is authorized with respect to both the first user 102 (e.g., the sending party) and the second user 104 (e.g., the receiving party). If the one or more rules engines determine that the transaction is not authorized (e.g., the transaction would violate aggregation rules, interdiction rules, etc.), the transaction may be terminated and the application may be configured to present feedback to the user 102 regarding the reasons that the transaction was not authorized. If the transaction is authorized by the one or more rules engines of the node 110, the transaction may be signed by the first user 102 and transmitted to the node 120.

Upon receiving the information (e.g., the signed transaction data) from the node 110, the node 120 may be configured to perform similar verifications using one or more rules engines of the node 120. Performing verifications of the transaction using the rules engines of both the nodes 110 and 120 may prevent situations where the transaction is authorized in error (e.g., the transaction is authorized according to rules applicable to one geographic area but not authorized according to rules applicable to another geographic area). If the transaction is determined to be authorized, the node 120 may transmit signed data to the node 110, which may indicate the transaction is authorized for execution. If the transaction is not authorized by the node 120, data indicating the reason(s) the transaction was not authorized may be transmitted to the node 110, which may be communicated to the first user 102 via the application, as described above.

Once the transaction has been signed and determined to be authorized for execution by the rules engine(s) of the nodes 110 and 120, the transaction may be transmitted to other nodes of the money transfer network 100, such as the notary node 130 and the observer node 140. These additional nodes may be configured to perform additional processing of the transaction. For example, the notary node 130 may be configured to validate one or more aspects of the transaction, such as to validate that digital assets associated with the transaction have not been allocated or utilized to facilitate other transactions in the money transfer network (e.g., funds to be transferred from the first user 102 to the second user 104 via the transaction were not previously used for or allocated to a different transaction). In an embodiment, when the transaction is validated by the notary node 130, the notary node 130 may sign the transaction and information associated with the signature of the notary may be stored in one or more locations where data associated with the transaction is stored, such as in a vault database of the node 110 and a vault database of the node 120. The observer node 140 may record the transaction data in a local database (e.g., a database of the observer node 140). The record of the transaction generated by the observer node 140 may identify the first user 102 (e.g., the sending party) and the second user 104 (e.g., the receiving party) using tokenized identity information instead of using PII data. Additionally, because the observer node 140 received transaction data that only includes tokenized identity data, the observer node 140 may be geographically remote to at least one of the nodes 110 and 120 (e.g., the observer node 140 may be located in the United States, Mexico, or another country) without risk of violating certain regulations regarding distributing PII data, such as regulations that restrict transmission of PII data to entities or systems outside a geographic region. Once processing of the transaction by the other nodes has completed, the transaction may be deemed written to the distributed ledger. It is noted that portions of the transaction may reside in different databases (e.g., databases of different nodes of the money transfer network).

It is noted that oracle node 150 may be utilized for some transactions initiated via the money transfer network 100. For example, suppose that the transaction between the user 102 and the user 104 described above required information associated with a foreign currency exchange rate (e.g., for converting funds from a first currency, such as the U.S. dollar, to a second currency, such as the Mexican peso). When such information is needed to facilitate all or a portion of a transaction, the relevant information (e.g., information that indicates the type of information the oracle node 150 is to obtain or provide, such as the two types of currency involved in a transaction, or other types of information) may be provided to the oracle node 150. The oracle node 150 may be configured to retrieve the requested information from one or more data sources 170, which may include internal data sources (e.g., data sources controlled by an entity that operates the money transfer network 100) and/or external data sources (e.g., third party data sources authorized for use in facilitating transactions via the money transfer network 100 by the entity that operates the money transfer network 100).

Where the transaction being processed by the money transfer network is a money transfer transaction between a sending party and a receiving party, such as in the exemplary transaction described above between the user 102 and the user 104, a node associated with the sending party or the receiving party may transmit one or more notifications to the involved parties. For example, the node 110 may transmit a notification to the sending party (e.g., the user 102) and the node 120 may transmit a notification to the receiving party. The notifications may indicate the transaction has been authorized for completion, provide information regarding receipt of or availability of funds (e.g., when the transferred funds will be available for pick up by or will be delivered to the receiving party, etc.). In an aspect, the distributed architecture of the money transfer network 100 may enable notifications to be transmitted to the receiving party (e.g., user 104 in the example above) by the node 110. For example, some methods of notification (e.g., e-mail) may not utilize PII data. Accordingly, the node 110 may request user 104's e-mail address from the second node 120 using the tokenized identity of user 104. Because the e-mail address may not be considered PII data, the second node 120 may provide the e-mail address to the first node 110 and the node 110 may transmit an e-mail notification to the user 104 that indicates the money transfer transaction has been initiated. The notification may also include additional information, such as information regarding a time when the funds will be available for pickup or deposited into an account (e.g., a bank account) of user 104 (it is noted that the notification may not indicate account numbers, the name of the bank, or other details that may be considered sensitive information or PII data), one or more suggested money transfer agent locations, or other information that informs the user 104 of the transaction and is not considered PII data. Additionally, because PII data is not required for certain types of notifications, a central server (not shown) of the money transfer network 100 may be utilized to provide the notifications to the user 102 and/or the user 104. For example, the central server of the money transfer network may be a dedicated notification server or a server that supports other operations of the money transfer network 100. In such a configuration, the central server may be notified (e.g., by the node 110, the node 120, or both) that the initiated money transfer transaction has been authorized and may initiate operations to obtain information regarding a communication channel (e.g., an e-mail address or another method of communicating information to a user that does not require PII data) for providing the notification(s) to the user 102, the user 104, or both. Additional aspects and operations of money transfer network 100 are described in more detail below with reference to FIGS. 3-9.

Figure 3:
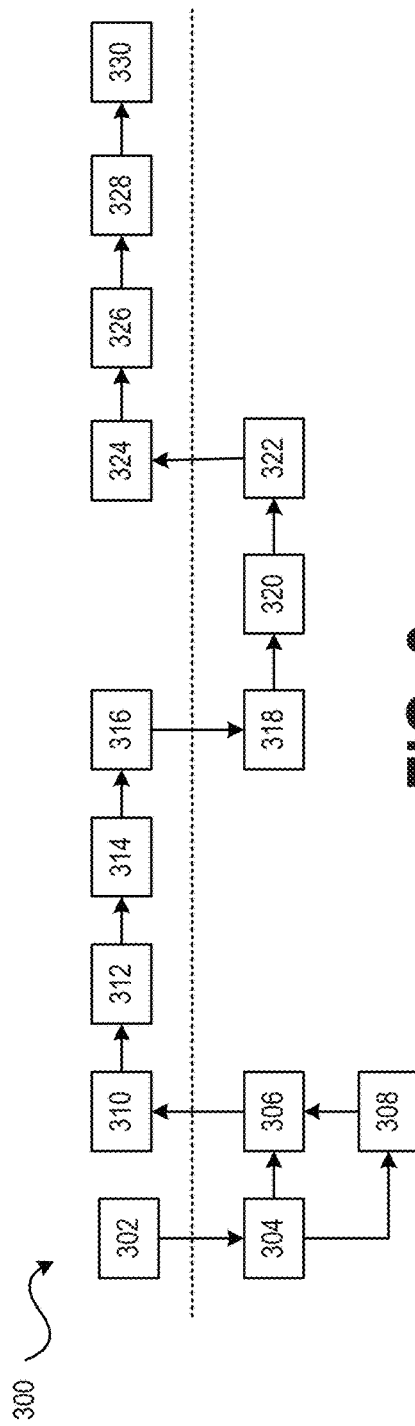
FIG. 3 is a flow diagram illustrating an exemplary work flow for executing a money transfer transaction in accordance with embodiments of the present disclosure.

Referring to FIG. 3, a flow diagram illustrating an exemplary work flow for executing a money transfer transaction in accordance with embodiments of the present disclosure is shown as a flow 300. As shown in FIG. 3, at step 302, a first user may configure a transaction for execution via a money transfer network configured in accordance with embodiments of the present disclosure. As explained above with respect to FIG. 1, configuration of the transaction may be performed using an application and may include providing information associated with the transaction, such as information identifying a party that is to receive funds in connection with the transaction. The configuration information may be received at a node of the money transfer network (e.g., node 110 of FIG. 1) and initial processing of the configuration information may be performed, which may include determining whether one or more parties to the transaction are local users (e.g., reside within a geographic area or region associated with the node) or remote/foreign users (e.g., reside within a geographic are or region associated with another node), as described above with respect to FIG. 1. In the example illustrated in FIG. 3, a user associated with the transaction is a remote user. Accordingly, at least a portion of the transaction data (e.g., a portion corresponding to the remote user) is received by a second node (e.g., a node associated with a different geographic area than the first node) and at step 304, the remote node may determine whether the user that was remote with respect to the first node is a local with respect to the second node and/or a registered user of the money transfer network.

As shown in FIG. 3, if the user is determined to be a registered local user with respect to the second node, the second node may be configured to transmit, at step 306, token data to the first node. As explained above, the token data may include a tokenized identity of the user. Verifying that all parties to a transaction are registered users may ensure that all transactions may be performed using tokenized identity data, rather than utilizing PII data. For example, as illustrated in FIG. 3, when a user is determined to not be a registered user, the flow 300 may include, at step 308, registering the user with the money transfer network. In an embodiment, the transaction data received from the first node may include contact information associated with the user, such as an e-mail address or telephone number, which may have been originally provided during configuration of the transaction. Using the contact information, the second node may initiate transmission of a notification to the non-registered user, where the notification may prompt the second user to register with the money transfer network. As described above, during registration a tokenized identity may be generated for the second user and a vault associated with the second user may also be created. Once the second user is registered, at step 308, the user's tokenized identity may be transmitted to the first node, as described above at step 306.

In an embodiment, registration of a user may be initiated when the user selects or otherwise activates a "register" function accessible via the application provided by the entity operating the money transfer network. In an embodiment, activation of the registration function may initiate a request to obtain the user's location. The user's location may be obtained via a global positioning system (GPS) device, such as using a GPS capability of the user's smartphone or tablet computing device, or may be obtained via another source, such as from packet data exchanged with the user's electronic device over a network. Upon obtaining the location of the user, the user may be connected to a node (e.g., a transaction node) of the money transfer network that is located in the same geographic location as the user. Additionally, or alternatively, the user may be prompted to select a geographic location via a menu displayed on a graphical user interface present to the user. For example, suppose that a citizen of a first country is visiting a second country and while visiting the second country desires to register with the money transfer network. The user may be prompted to select the first country or the second country as a "home" country for purposes of establishing a vault and associating the user with a particular geographic region served by the money transfer network. In this manner, if the user is merely visiting the second country, the user can select the first country as the place where the user is registered. On the other hand, if the user resides in the second country but is a citizen of the first country, the user may select the second country as the place where the user is registered.

Once connected to the node in the appropriate geographic region, a tokenized identity may be generated for the user. Additionally, a device fingerprint associated with the electronic device from which the user is registering may be obtained and evaluated against a threat matrix (e.g., to determine whether the electronic device is a device known to have been previously used for fraudulent or other malicious purposes, to determine whether the device is a private or public device, to determine whether the device lacks appropriate security measures, and the like. In an aspect, the device fingerprint may be obtained (e.g., by an oracle node) from a third party service provider, such as an entity that provides security services to the money transfer network. The results of the evaluation may be stored in a database of the money transfer network, such as in connection with a user profile being created for the user in a user database of the connected node.

The user may be prompted to enter a telephone number into the graphical user interface and the telephone number provided by the user may be verified against a list of existing telephone numbers associated with registered users of the money transfer network, such as to verify that the user has not already registered with the money transfer network. If the telephone number has not been previously registered, a one-time-password may be transmitted to the user, such as via an e-mail message, a text message, an automated voice response system message, and the like. The user may be prompted to enter the one-time-password and upon providing the correct password, the telephone number may be stored in associated with the user's account. Additionally, the telephone number may be subjected to a risk evaluation. The risk evaluation may be performed by the money transfer network 100, such as via one of the rules engines 230 of FIG. 2, or may be performed by a third party service provider (e.g., Danal™). The risk evaluation may be configured to check the validity of the mobile number provided by the user and in some cases may include interrogating the user's mobile device. The risk evaluation may be performed in a manner similar to obtaining the device finger print in the example given above, and may be one of many risk checks the money transfer service provider utilizes depending on the risk profile of the users in question. A result of the risk evaluation may be stored by the connected node.

As part of the registration process, the user may be prompted to indicate the user's nationality and based on the indicated nationality, an appropriate template (e.g., a template configured to comply with regulations required by the indicated nationality or another designated country if the user is a resident of a different country than he/she is a citizen of) may be retrieved for obtaining the user's personally identifiable information. The user may populate the template with the relevant personally identifiable information and the information may be stored in a user database maintained by the connected node. As described with reference to FIG. 2, the input information may be encrypted before being added to the user database.

In an embodiment, additional inputs and requirements may be imposed on a new user and/or an existing user under certain circumstances. For example, if the user desires to increase limits (e.g., limits for funding transactions with a credit card, etc.), various types of risk data may be compiled from data known to the money transfer network and/or from third party data sources, such as LexisNexis®, Emailage®, Mitek®, Yoti®, and the like. Such third party data sources may provide various services (e.g., verification of a user's identity documents, email address, credit score, and other data) that may be used to build risk scores for users of the money transfer network 100. It is noted that third party services providers utilized to provide various services and data that facilitate operations of the money transfer network 100 may include regional service providers (e.g., service providers that provide data and services for a specific geographic region, such as a single country or multiple countries, etc.) and global service providers (e.g., service providers that provide data and services for all geographic regions serviced by the money transfer network 100). The collected risk data may be stored in association with the user's account and provided to a risk evaluation engine of the connected node. The risk evaluation engine may be configured to determine one or more risk factors associated with the user based on the risk data and to authorize the requested modifications to the user's account based on the determined risk factors. It is noted that the user registration process described above has been provided by way of illustration, rather than by way of limitation and that the various registration operations described herein may be performed in a different order and/or may utilize different or additional registration processes, such as requiring the user to submit a copy of the user's identification (e.g., a copy of a government issued identification card, such as a driver license or a passport) or submit biometric inputs.

As described above with reference to FIG. 1, in response to receiving the tokenized identity of the second user, the first node may create a transaction, at step 310. Creating the transaction may include creating a transaction identifier and associating the transaction identifier with the tokenized identities of the first and second users. Once the transaction is created, various rules engines may be executed against the transaction data to verify compliance with internal and/or external regulatory requirements and risk mitigation processes. For example, at step 312, the first node may execute an aggregation rules engine against the transaction data to verify the transaction complies with various aggregation rules and regulations (e.g., identify instances where multiple smaller transactions are executed to attempt to avoid regulations that limit the size of a particular transaction amount, etc.). Assuming that the transaction complies with the appropriate requirements verified by the aggregation rules engine at step 312, the first node may execute, at step 314, an interdiction rules engine against the transaction data to determine whether any of the parties to the transaction are precluded from participating in transactions via the money transfer network.

If the transaction does not pass the checks of the aggregation rules engine and/or the interdiction rules engine, the transaction may be prohibited from further processing until the transaction has been cleared to continue. For example, when a transaction is flagged by the one or more rules engines of the first node, a notification may be transmitted to fraud and risk mitigation personnel associated with the money transfer network. The fraud and risk mitigation personnel may attempt to resolve any issues that resulted in the transaction being flagged and if the issues are resolved may release the transaction for further processing. If the fraud and risk mitigation personnel cannot resolve all of the issues that resulted in the transaction being flagged, the transaction may be canceled and a notification to that effect may be provided to the first user, such as via an e-mail message, a text message, an automated voice response system, a notification provided via the application providing the first user with access to the money transfer system 100, and the like.

In an aspect, the money transfer network 100 may be configured to facilitate automatic transaction processing such that when a transaction fails it is not held in limbo while waiting for fraud and risk mitigation personnel to investigate the transaction. For example, if the transaction does not pass the checks of the aggregation rules engine and/or the interdiction rules engine, the transaction may be prohibited from further processing and may fail. When a transaction fails due to the checks performed by the one or more rules engines, a notification may be transmitted to the user and/or fraud and risk mitigation personnel. The user may contact the fraud and risk mitigation personnel to inquire about the reason for the failure and the fraud and risk mitigation personnel may investigate and potentially resolve issues that caused the transaction to fail, at which point the user may retry the transaction. If all of the issues were resolved, the transaction may proceed.

If the transaction passes the checks performed at steps 312 and 314, the transaction may proceed to step 316, where the transaction is signed. After signing the transaction the first node may transmit transaction data to the second node. The transaction data may include the transaction identifier, the transaction amount, the tokenized identities of the parties involved in the transaction, and the like. Similar to the operations performed at steps 312 and 314, the second node may execute an aggregation rules engine at step 318 and an interdiction rules engine at step 320. If either of the checks performed at steps 318 and 320 fails, fraud and risk mitigation personnel may be notified as described above. If the checks performed at steps 318 and 320 pass, or if the fraud and risk mitigation personnel were able resolve any issues associated with the checks failing, the transaction may be signed at step 322 and the transaction data, which may now include the signature generated by the second node in addition to the aforementioned transaction data (e.g., transaction identifier, transaction amount, and the like, may be transmitted to the first node. At step 324, the signed transaction data may be transmitted to one or more additional nodes as described above. For example, at step 326, the signed transaction data may be transmitted to an observer node and at step 328, the signed transaction data may be transmitted to a notary node, as described above with reference to FIG. 1. At step 330, the transaction may be deemed written to the distributed ledger of the money transfer network. It is noted that although the exemplary work flow illustrated in FIG. 3 has been described as including aggregation and interdiction processing, such processing steps have been provided for purposes of illustration, rather than by way of limitation. Accordingly, it is to be understood that a money transfer network operating in accordance with the present disclosure may include different or additional processing steps and the processing steps may be performed in a different order than described above.

Figure 4:
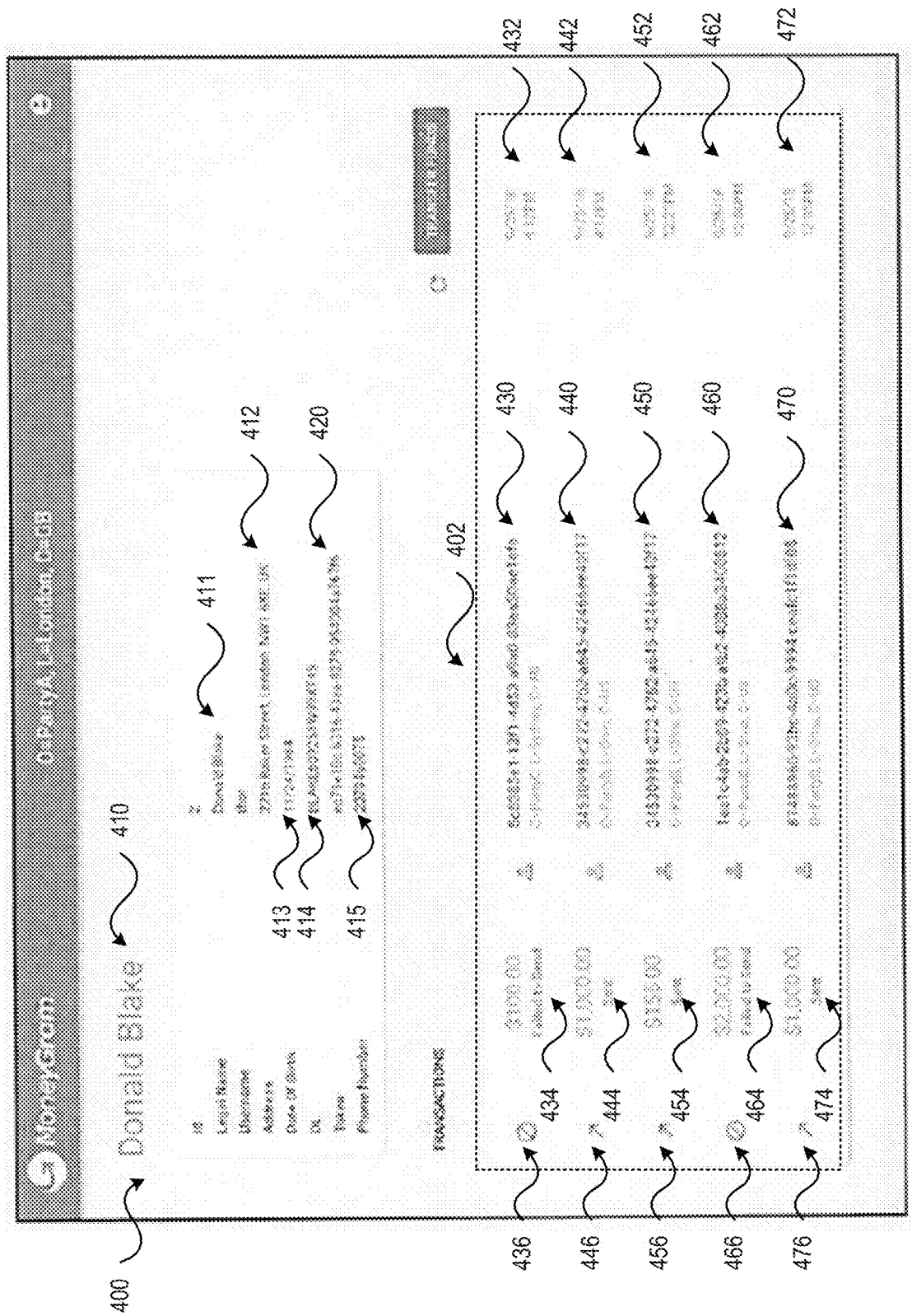
FIG. 4 is a screenshot of an exemplary user interface for viewing user information in accordance with embodiments of the present disclosure.

Referring to FIG. 4, a screen shot of an exemplary user interface for viewing user information in accordance with embodiments of the present disclosure is shown as an interface 400. In an aspect, the interface 400 illustrated in FIG. 4 may be presented to a user of a money transfer network configured in accordance with embodiments of the present disclosure. For example, the user may be a user that participates in transaction executed via the money transfer network and the interface 400 may present the user with information associated with the user's profile, which may be maintained in a database of a node of the money transfer network, such as a node in a same geographic region as the user. As another example, the user may be a fraud and risk mitigation specialist employed by an entity that operates the money transfer network. Where the viewing user is a user of the money transfer network 100, the user may be able to view the PII data (e.g., since the viewing user owns the PII data). When the viewing user is not the owner of the PII data (e.g., the user is an employee of the money transfer service provider or some other entity), the user may only be presented with tokenized user data unless appropriate authorization has been obtained to allow the viewer to see the user's PII data. Appropriate authorization may be obtained, for example, when there is a legal reason or a valid business reason to enable the viewer to access to the user's PII. When an appropriate authorization is obtained, the viewer may be presented with the PII data regardless of where the viewer is when accessing the data. Should someone outside of a geographical area need access to PII for any reason, the rules associated with allowing that access must first be satisfied (e.g., a subpoena, a warrant, etc.) before that data is shared. Further, when a third party viewer is presented with a user's PII data, one or more notifications may be presented that instruct the viewer that only people that need to view the information are authorized to view the PII data.

As shown in FIG. 4, the user interface 400 may be configured to display a profile 410. The profile 410 may include information associated with a user's legal name 411, the user's address 412, the user's date of birth 413, the user's driver license number 414, and the user's telephone number 415. Additionally, the profile 410 may include additional information, such as an identifier associated with the user, the user's username (e.g., a username utilized to authenticate the user with the money transfer network), or other information. The profile 410 may also include the user's tokenized identity 420.

In an embodiment, tokenized identities, such as the tokenized identity 420 illustrated in FIG. 4, may be universal unique identifiers (UUIDs) within the money transfer network. For example, the tokenized identities may be generated as 128-bit values that include 32 characters and 4 dashes ("-"), such as "4a9ed363-31da-4503-8a62-313d4e4e90a2." It is noted that generating tokenized identities as 128-bit values that include 32 characters and 4 dashes is but one example of a representation of a tokenized identity suitable for use in a money transfer network operating in accordance with the present disclosure, but that longer or shorter tokenized identities with or without dashes may be utilized in some embodiments depending on the particular configuration of the money transfer network. In an aspect, the tokenized identities may be generated by providing a data set to an encoding engine configured to take the data set as an input and generate a tokenized identity based on the input data set. For example, the data set may include one or more pieces of information associated with a user, such as the user's name, date of birth, nationality. As another example, the data set may include one or more pieces of information not associated with the user, such as an identifier associated with the node creating the tokenized identity for the user, a time stamp, etc. It is noted that the exemplary contents of the data set described above have been provided for purposes of illustration, rather than by way of limitation and that embodiments of the present disclosure may be configured to generate tokenized identities using any of the aforementioned information or other types of information depending on the particular configuration of the money transfer network. In an aspect, the encoding engine may apply a hash function, such as an MD5 hash function, to the input data set to generate the tokenized identity for the user. It is noted that utilizing an MD5 hash function to generate the tokenized identities has been described for purposes of illustration, rather than by way of limitation and that money transfer networks operating in accordance with embodiments of the present disclosure may be implemented using other encoding techniques suitable for generating tokenized identities in accordance with the present disclosure.

A portion 402 of the interface 400 may be configured to display information associated with various transactions in which the user has participated. For example, as shown in FIG. 4, the user may have participated in a plurality of transactions 430, 440, 450, 460, 470 and information associated with each transaction may be displayed in a different row of the portion 402. As illustrated in FIG. 4, the interface 400 may display a timestamp 432, 442, 452, 462, 472 for each transaction (e.g., timestamp 432 corresponds to transaction 430, timestamp 442 corresponds to transaction 440, timestamp 452 corresponds to transaction 450, timestamp 462 corresponds to transaction 460, and timestamp 472 corresponds to transaction 470). As shown in FIG. 4, the timestamp information may include date information (e.g., mm/dd/yy) and time information, which may indicate the time and date when the transaction was executed. Additionally, the interface 400 may display status information regarding the transaction(s) and the status information may be displayed in various ways. For example, the status information may be displayed via status messages 434, 444, 454, 464, 474, which may provide information regarding whether the transaction was completed, failed, etc. Additionally, the status information may be displayed via status icons, such as status icons 436, 446, 456, 466, 476. As shown in FIG. 4, the status icons may include various graphical icons that may signify different transaction states (e.g., a circle with a slash, as in icon 436, may indicate the transaction failed or was canceled, an arrow pointing up, as in icon 444, 454, 474, may indicate a successful send transaction and an arrow pointing down may signify a receive transaction. It is noted that the interface 400 shown in FIG. 4 has been provided for purposes of illustration, rather than by way of limitation and that other GUIs and/or information may be displayed depending on the particular configuration of the money transfer network.

Figure 5:
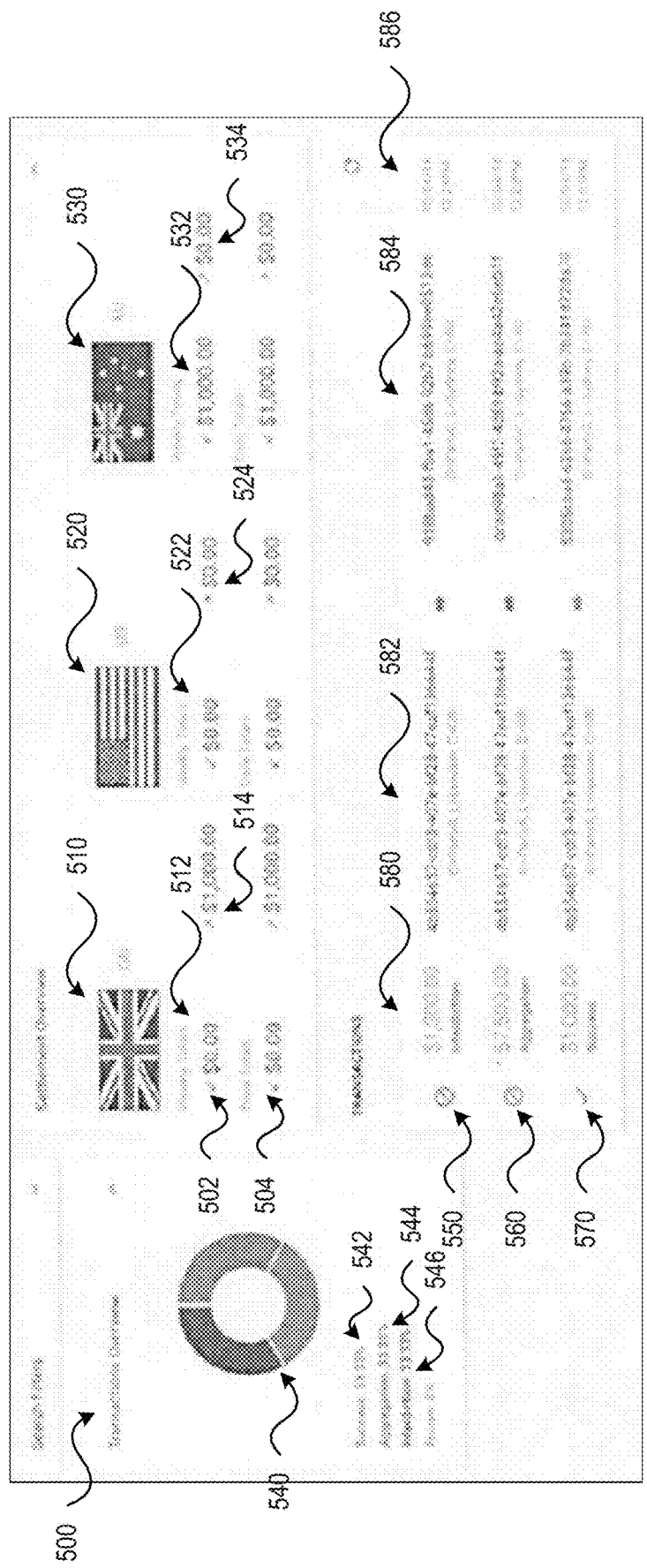
FIG. 5 is a screenshot of an exemplary dashboard for viewing money transfer transaction data in accordance with embodiments of the present disclosure.

Referring to FIG. 5, a screenshot of an exemplary dashboard for viewing money transfer transaction data in accordance with embodiments of the present disclosure is shown as an interface 500. In an embodiment, the interface 500 may be utilized by an entity that operates a money transfer network to manage various aspects of the transactions executed via the money transfer network. As shown in FIG. 5, the dashboard may present geographic location information associated with locations where various transaction nodes are deployed, such as via icons 510, 520, 530. It is noted that although FIG. 5 illustrates the geographic location information via flags of the various countries (e.g., Great Britain, the United States, and Australia), the geographic location information could be displayed in other ways, such as via a map, words, or some other form of indication.

In FIG. 5, rows 502 and 504 are shown below the icons 510, 520, 530. The rows 502 and 504 may present information associated with transactions executed within the different geographic regions indicated by icons 510, 520, 530 in different ways. For example, row 502 may display transaction information over a first period of time (e.g., a month, a week, etc.) and the row 504 may display transaction information over a second period of time (e.g., a month, a week, etc.). Each of the rows 502, 504 may have a plurality of columns 512, 514, 522, 524, 532, 534 that each display different information with respect to the different geographic locations. For example, columns 512, 522, 532 may display information regarding a total amount of funds received by users within the geographic regions via transactions executed on the money transfer network, while columns 514, 524, 534 may display information regarding a total amount of funds sent by users within the geographic regions via transactions executed on the money transfer network. It is noted that the particular rows and columns described above have been provided for purposes of illustration, rather than by way of limitation, and that more than two rows or less than two rows may be provided by a dashboard interface in some embodiments.

The interface 500 also provides a graphical depiction (e.g., via chart 540) and a text-based depiction (e.g., successful transaction percentage 542, failure for aggregation rules percentage 544, and failure for interdiction rules percentage 546) of transactions executed via the money transfer network. It is noted that the particular depictions illustrated at 540, 542, 544, 546 have been provided for purposes of illustration, rather than by way of limitation, and that other types of graphical indicators (e.g., pie charts, bar charts, etc.) textual depictions (e.g., tables, etc.) and the like may be provided in accordance with embodiments of the present disclosure.

Interface 500 also includes rows 550, 560, 570, each having columns 580, 582, 584, 586. Similar to the portion 402 of interface described above, each row 550, 560, 570 may correspond to a different transaction and each column 580, 582, 584, 586 may provide different types of information regarding the transaction, such icons indicating the success or failure of the transaction, the amount of the transaction, timestamps associated with the transaction information regarding tokenized identities of the participants of the transaction, and the like. The dashboard provided by interface 500 may allow a user to view various information regarding transactions and operations of the money transfer network.

The dashboard may enable a user to view how much money has been transacted between a first location and other remote geographic locations via the money transfer network, such as viewing an amount of funds involved in outbound transactions between the United States and Mexico (e.g., one or more sending parties in the United States is transferring money to one or more receiving parties in Mexico) or an amount of funds involved in outbound transactions between the United Kingdom and Australia (e.g., one or more sending parties in the United Kingdom is transferring money to one or more receiving parties in Australia). For example, column 512 illustrates a total of $0.00 has been transferred into the United Kingdom, column 514 illustrates a total of $1,000.00 has been transferred out of the United Kingdom, column 522 illustrates a total of $0.00 has been transferred into the United States, column 524 illustrates a total of $0.00 has been transferred out of the United States, column 532 illustrates a total of $1,000.00 has been transferred into Australia, and column 534 illustrates a total of $0.00 has been transferred out of Australia. In an embodiment, the user may select one of the geographic indicators 510, 520, 530, one of the amounts indicated in columns 512, 514, 522, 524, 532, 534, or may use a different interface or control to view additional information that provides a breakdown of the sources of funds flowing into the geographic location, such as to view each geographic region that transferred funds into a particular geographic region or each geographic region to which funds were transferred to from the particular geographic region.

In an embodiment, interface 500 may be modified to include additional columns that indicate amounts of funds that have been actually paid out (e.g., to receiving parties) and amounts of funds that have not been paid out. Such information may assist the entity operating the money transfer network in managing distribution of funds to appropriate locations within the money transfer network. For example, when a user in the United Kingdom configures a transaction to transfer $1,000.00 to a user in Australia, the dashboard may indicate the outbound transaction amount in column 514 and the inbound transaction amount in column 532. When the funds of the outbound transaction are received in the United Kingdom, the funds may be provided to an account in the United Kingdom that is maintained by the entity operating the money transfer network, and the funds of the inbound transaction in Australia may be paid from an account in Australia that is maintained by the entity operating the money transfer network. To ensure that the accounts balance out, the funds may be transferred from the account in the United Kingdom to the account in Australia. In an embodiment, the funds may be transferred via an automated clearing house (ACH) transfer, an electronic funds transfer (EFT), or other types of transfer services which may be provided by various types of financial institutions, such as banks.

In an additional or alternative embodiment, the funds may be transferred using one or more cryptocurrencies. For example, the entity operating the money transfer network may maintain one or more crypto wallets associated with one or more different cryptocurrencies. To facilitate the transfer of the funds from the United Kingdom to Australia, the money transfer network (or a node of the money transfer network) may initiate operations to acquire a quantity of cryptocurrency corresponding to the value to be transferred to Australia and may transfer or allocate the quantity of cryptocurrency to an account maintained with a cryptocurrency exchange accessible to entities operating in Australia or to a node of the money transfer network deployed in Australia. Once received, the quantity of cryptocurrency may be sold and the proceeds of the sale may be placed in the account in Australia, thereby ensuring that the account in Australia is balanced out. For example, if the amount paid out for the transfer of $1,000.00 was paid out prior to the funds being deposited into the account in Australia, the account balance may be $1,000.00 lower than it should be. Once the proceeds of the sale of cryptocurrency are deposited into the account, the account may be considered balanced. It is noted that the amount transferred between the account in the first location (e.g., a location where the transaction was funded) and the second location (e.g., a location where the transaction is paid out) may be greater than the amount paid out at the second location. For example, the amount transfer between the accounts may include a fee charged by the entity for paying out the transaction in the second location. Additionally, the initial amount of funds received into the account associated with the first location may be greater than the amount of funds transferred to the account associated with the second location. For example, the funding amount received into the account associated with the first location may include a fee amount charged by the first location for facilitating the transfer of funds to the receiving party in the second location. Thus, the funding amount for a transaction executed via the money transfer network may include a receive amount (e.g., an amount of funds to be paid out to a receiving party) and a fee amount, which may include one or more amounts associated with one or more fees charged for facilitating the transfer of funds via the money transfer network.

In an additional or alternative embodiment, the one or more crypto wallets maintained by the entity operating the money transfer network may hold existing quantities of one or more cryptocurrencies. For example, a crypto wallet associated with a first cryptocurrency may be associated with transactions initiated in or destined for the United Kingdom and a second crypto wallet associated with a second cryptocurrency may be associated with transactions initiated in or destined for the Australia. When a send transaction is received via a node located in the United Kingdom and the destination of the send transaction is Australia, a node of the money transfer network may allocate an amount of cryptocurrency equivalent to the send amount (including any fees to be paid to an agent located in Australia) may be allocated from the first crypto wallet to the second crypto wallet. Rather than selling the amount of cryptocurrency upon receiving the amount of cryptocurrency into the second crypto wallet, the accounts may be considered balanced because the agent in Australia holds assets equivalent to the value of the amount to be paid out to the receiving party of the transaction. To facilitate such a transaction, one or more nodes of the money transfer network may configured to settle transactions using cryptocurrencies. For example, one or more settlement nodes may be deployed within the money transfer network. These nodes may be configured to process cryptocurrency transactions to facilitate transactions via the money transfer network via one or more cryptocurrencies, as described herein.

It is noted that the exemplary aspects of utilizing cryptocurrencies to facilitate funds transfers via the money transfer network described above have been provided for purposes of illustration, rather than by way of limitation and that other techniques for utilizing cryptocurrencies to facilitate transactions via the money transfer network may be utilized in accordance with embodiments of the present disclosure. For example, additional techniques that may be utilized to facilitate transactions using cryptocurrencies via a money transfer network in accordance with embodiments of the present disclosure are described in co-pending and commonly owned U.S. patent application Ser. No. 15/953,282, filed Apr. 13, 2018, and entitled "SYSTEMS AND METHODS FOR IMPLEMENTING BLOCKCHAIN-BASED MONEY TRANSFER," the contents of which are expressly incorporated herein by reference.

Figure 7:
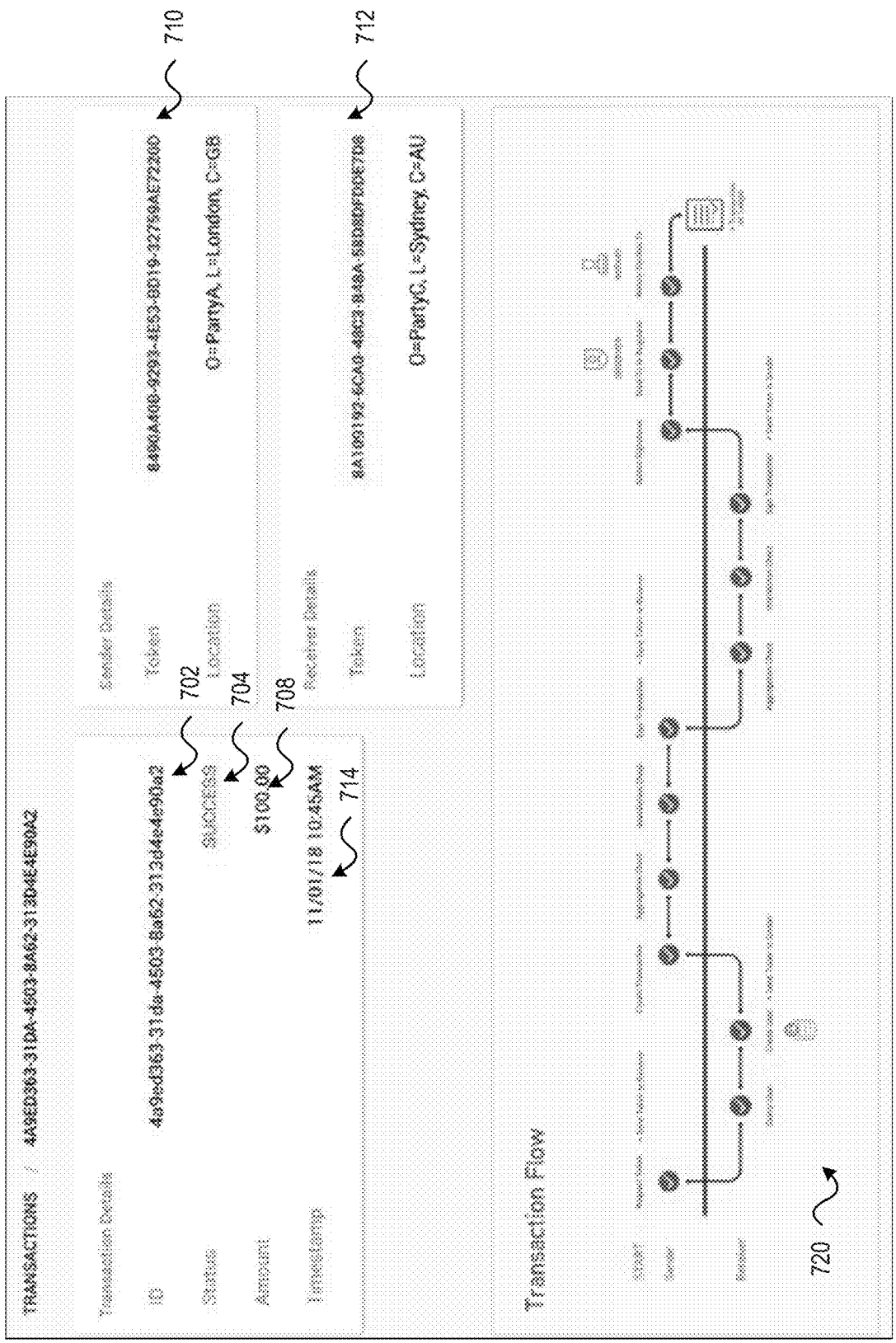
FIG. 7 is a screenshot of an exemplary user interface for viewing a money transfer transaction in accordance with embodiments of the present disclosure.
Figure 8:
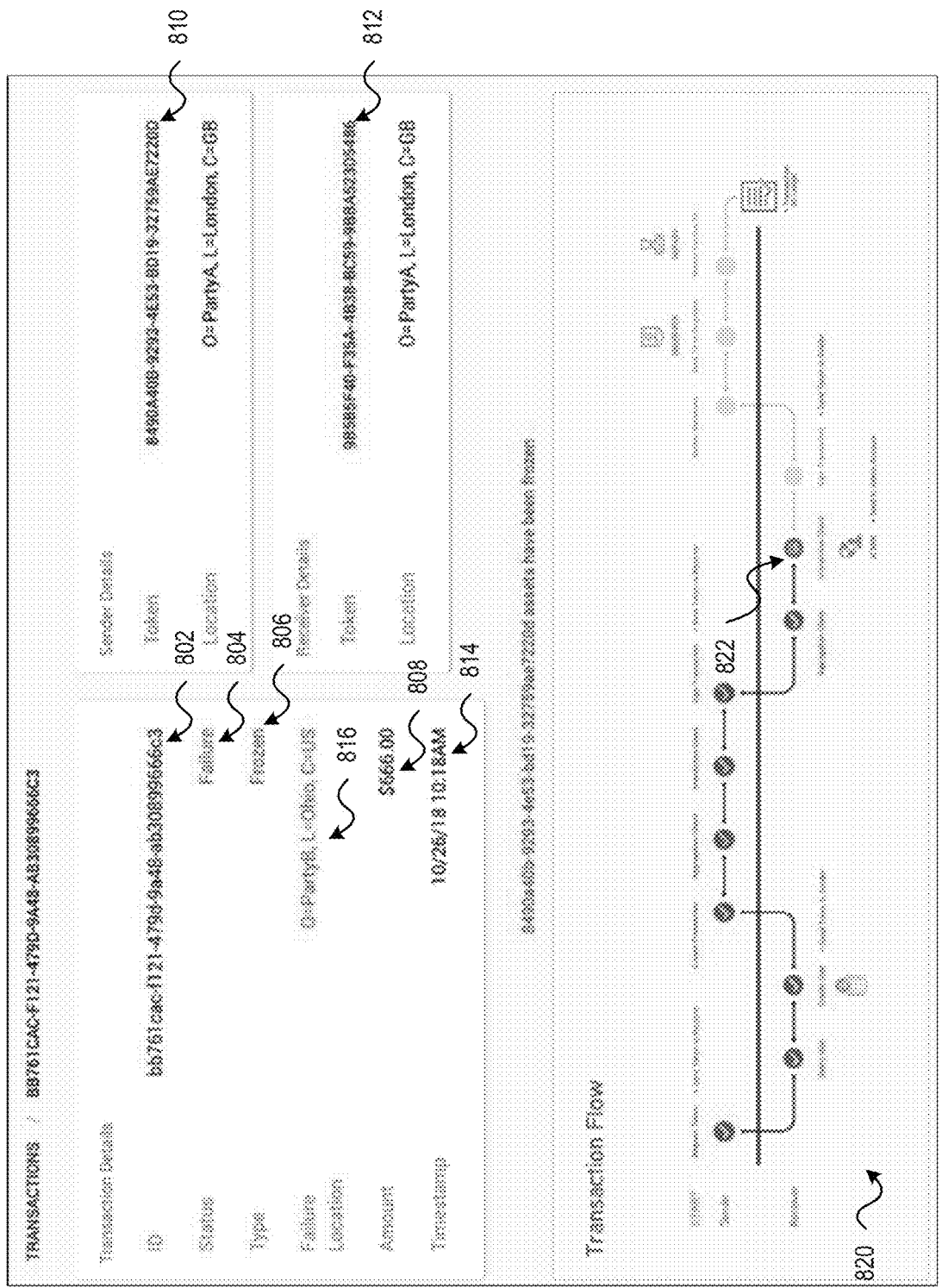
FIG. 8 is a screenshot of an exemplary user interface for viewing a money transfer transaction in accordance with embodiments of the present disclosure.

Interface 500 of the dashboard illustrated in FIG. 5 also enables a user to view details of a particular transaction indicated in rows 550, 560, 570. To view details of the transaction, the user may simply click on one of the rows. Exemplary detailed views of transactions that may be accessed from the interface 500 are illustrated in FIGS. 6-8.

Figure 6:
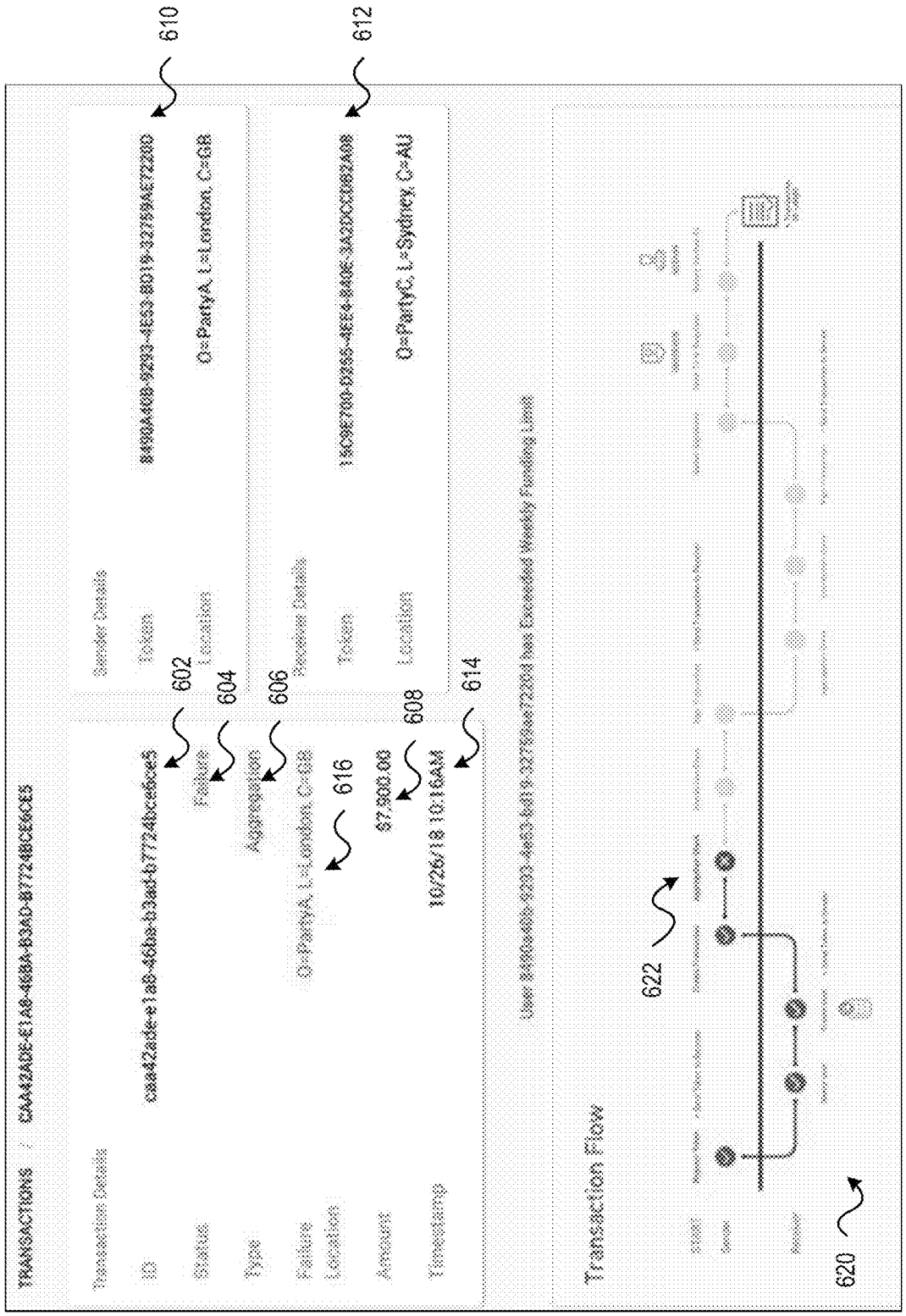
FIG. 6 is a screenshot of an exemplary user interface for viewing a money transfer transaction in accordance with embodiments of the present disclosure.

Referring to FIG. 6, a screen shot of an exemplary user interface for viewing a money transfer transaction in accordance with embodiments of the present disclosure is shown. As shown in FIG. 6, the interface may include information regarding a transaction identifier 602, an outcome indicator 604, a failure point indicator 606, a transaction amount 608, a tokenized identity 610 associated with the sending party, a tokenized identity 612 associated with the receiving party, a timestamp 614, a location indicator 616, and a transaction flow interface 620. The transaction identifier 602 may be an identifier that is substantially unique across the entire money transfer network (e.g., no two transactions have the same transaction identifier). The outcome indicator 604 may indicate whether the transaction was successful or failed. The failure point indicator 606 may indicate the reason that a transaction failed and may only be present when the outcome indicator 604 indicates a failed transaction (i.e., the failure point indicator 606 may not be provided when the transaction is successful, as illustrated in FIG. 7). The transaction amount 608 may indicate an amount of funds to be transferred via the transaction, the tokenized identity 610 may be the tokenized identity of the sending party, and the tokenized identity 612 may be the tokenized identity of the receiving party. The timestamp 614 may indicate a time when the transaction was created, a time when the transaction failed, or a time when the transaction was determined to be successful (e.g., authorized for execution via the money transfer network).

The location indicator 616 may provide information regarding where a particular failure condition was identified. For example, as explained above, when the sending party and receiving party are located in different geographic locations, various compliance checks may be performed by nodes in each geographic location to verify the transaction satisfies the appropriate regulatory requirements (e.g., internal and external or government agency regulations). The location indicator 616 may indicate which party caused the transaction to fail one of the compliance checks. For example, as shown in FIG. 6, location indicator 616 includes "O=PartyA," which indicates that the sending party was responsible for the failure. The location indicator 616 may also indicate a location where the failed compliance check was performed. For example, the location indicator 616 indicates "L=London, C=GB" indicating that the failed compliance check was performed by a node in London in the country of Great Britain. The location indicator 616 in conjunction with the failure point indicator 606 may provide information that enables the user to quickly determine the reason for the failure of the transaction. In the example illustrated in FIG. 6, the user may be able to quickly determine that the transaction identified by transaction identifier 602 failed due to an aggregation compliance check performed by a node located in London, and that the transaction amount 608 caused the sending party 610 to exceed one or more aggregation rules.

The transaction flow interface 620 also provides a quick reference for identifying the particular point in the transaction flow where the transaction failed. For example, the transaction flow 620 includes various steps or transaction stages (e.g., similar to the transaction steps illustrated and described above with reference to FIGS. 1 and 3). At 622, the transaction flow 620 indicates the aggregation compliance check failed at a node associated with the geographic location of the sender. Thus, the transaction flow interface

620 may also provide the user with a quick way of determining information regarding the status of a transaction.

Referring to FIG. 7, a screen shot of an exemplary user interface for viewing a money transfer transaction in accordance with embodiments of the present disclosure is shown. Similar to the interface illustrated in FIG. 6, the interface shown in FIG. 7 includes information regarding a transaction identifier 702, an outcome indicator 704, a transaction amount 708, a tokenized identity 710 associated with the sending party, a tokenized identity 712 associated with the receiving party, a timestamp 714, and a transaction flow interface 720. As shown in FIG. 7, the outcome indicator 704 indicates the transaction was successful (e.g., authorized for completion via the money transfer network). Because the transaction was successful, the failure point indicator and location indicator may not be displayed. Similar to the interface illustrated in FIG. 6, the interface illustrated in FIG. 7 utilized tokenized identities 710, 712 to indicate the sending and receiving parties. As shown in FIG. 7, for successful transactions the transaction flow interface 720 may indicate that all compliance checks were successful (e.g., as indicated by the checkmarks at each step of the transaction flow).

Referring to FIG. 8, a screen shot of an exemplary user interface for viewing a money transfer transaction in accordance with embodiments of the present disclosure is shown. Similar to the interface illustrated in FIG. 6, the interface shown in FIG. 8 may include information regarding a transaction identifier 802, an outcome indicator 804, a failure point indicator 806, a transaction amount 808, a tokenized identity 810 associated with the sending party, a tokenized identity 812 associated with the receiving party, a timestamp 814, a location indicator 816, and a transaction flow interface 820. The transaction identifier 802 may be an identifier that is substantially unique across the entire money transfer network (e.g., no two transactions have the same transaction identifier). The outcome indicator 804 may indicate whether the transaction was successful or failed. The failure point indicator 806 may indicate the reason that a transaction failed and may only be present when the outcome indicator 804 indicates a failed transaction (i.e., the failure point indicator 806 may not be provided when the transaction is successful, as illustrated in FIG. 7). The transaction amount 808 may indicate an amount of funds to be transferred via the transaction, the tokenized identity 810 may be the tokenized identity of the sending party, and the tokenized identity 812 may be the tokenized identity of the receiving party. The timestamp 814 may indicate a time when the transaction was created, a time when the transaction failed, or a time when the transaction was determined to be successful (e.g., authorized for execution via the money transfer network).

The location indicator 816 may provide information regarding where a particular failure condition was identified. For example, as explained above, when the sending party and receiving party are located in different geographic locations, various compliance checks may be performed by nodes in each geographic location to verify the transaction satisfies the appropriate regulatory requirements (e.g., internal and external or government agency regulations). The location indicator 816 may indicate which party caused the transaction to fail one of the compliance checks. For example, as shown in FIG. 8, location indicator 816 includes "O=PartyB," which indicates that the party that was responsible for the failure. The location indicator 816 may also indicate a location where the failed compliance check was performed. For example, the location indicator 816 indicates "L=Ohio, C=US" indicating that the failed compliance check was performed by a node in Ohio in the United States. By including all three pieces of information (e.g., "O=PartyB, L=Ohio, C=US" in the location indicator 816, a specific node may be identified. For example, there may be multiple nodes deployed in a data center of the money transfer network located in Ohio, but only one of the nodes was involved in processing the transaction. Thus, the specific node in Ohio (e.g., "L=Ohio, C=US") that processed the transaction for the user identified by "O=PartyB") may be identified using the location indicator 816. The location indicator 816 in conjunction with the failure point indicator 806 may provide information that enables the user to quickly determine the reason for the failure of the transaction. In the example illustrated in FIG. 8, the user may be able to quickly determine that the transaction identified by transaction identifier 802 failed due to an interdiction compliance check performed by a node located in Ohio, and that a party to the transaction was identified on an interdiction list as an entity that cannot participate in the transaction.

The transaction flow interface 820 also provides a quick reference for identifying the particular point in the transaction flow where the transaction failed. For example, the transaction flow 620 includes various steps or transaction stages (e.g., similar to the transaction steps illustrated and described above with reference to FIGS. 1 and 3). At 822, the transaction flow 820 indicates the interdiction compliance check failed at a node associated with the geographic location of the receiver. Thus, the transaction flow interface 820 may also provide the user with a quick way of determining information regarding the status of a transaction.

By utilizing tokenized identities to display transaction data, as illustrated above in FIGS. 6-8, the transaction data may be viewed and accessed by users in different geographic areas without the risk of potentially compromising PII data, which enables the money transfer network to be operated in locations where PII data may not be provided to entities or systems outside a defined geographic location. If a user outside a permitted geographic location needs to access the PII data to investigate a transaction, a node within the permitted geographic location may be notified and operations to obtain authorization to provide the PII data to the user may be initiated, such as to obtain a subpoena from the appropriate government authority in the permitted geographic area. Alternatively or additionally, the user outside the permitted geographic area may contact (e.g., via a telephone call, an e-mail, an instant message, a text message, etc.) a user within the permitted geographic area and explain the type of investigation that needs to be performed with respect to one or both of the tokenized identities. Because the user within the permitted geographic area is authorized to view the PII data, that user may perform the investigation and take any appropriate actions based on the results of the investigation.

Figure 9:
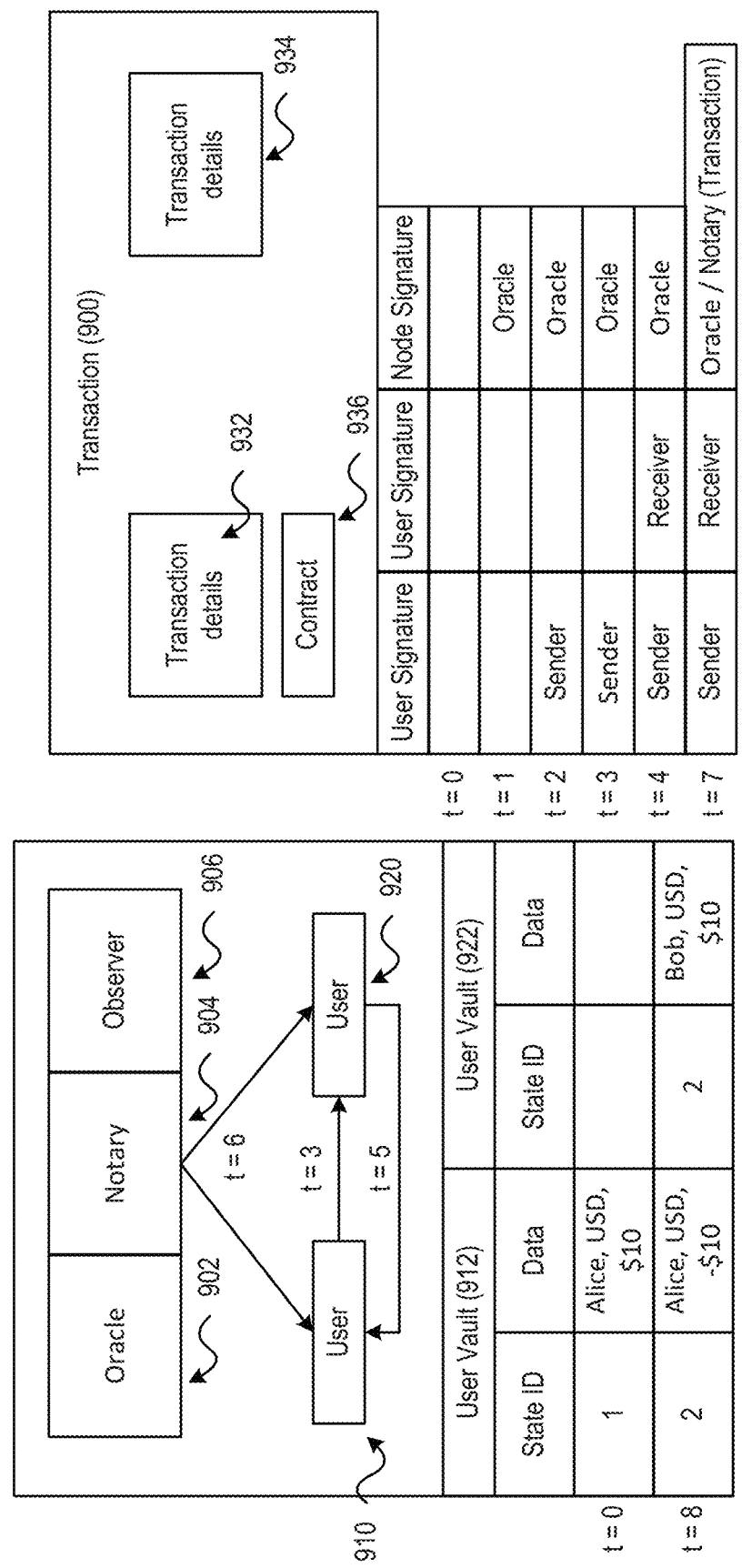
FIG. 9 is a block diagram illustrating aspects of a money transfer transaction performed in accordance with embodiments of the present disclosure.

Referring to FIG. 9, a block diagram illustrating aspects of a money transfer transaction performed in accordance with embodiments of the present disclosure is shown is shown as a transaction 900. In the transaction 900, a first user 910 is transferring an amount of funds (e.g., $10.00) to a second user 920. As described above, the first user 910 may be associated with a vault 912 and the second user 920 may be associated with a vault 922, where the vault 912 may be maintained by a node (e.g., a transaction node) in the same geographic location as the first user 910's place of residence and the vault 922 may be maintained by a node (e.g., a transaction node) in the same geographic location as the first user 910's place of residence.

To initiate the transaction, the first user 910 may utilize an application to access the money transfer network. Via the application, the first user 910 may configure the transaction, such as to provide inputs to one or more GUIs that indicate the send amount, the receiving party, and the like, as described above. Once the data fields of the one or more GUIs are completed, the application may transmit the information provided by the first user 910 to a node (e.g., a transaction node) in the same geographic location as the first user 910. Upon receiving the transaction data, the node may determine whether the first user 910 and/or the second user 912 are local users or remote/foreign users as described above. Once the first and second users are determined to be registered users and identified as local or remote/foreign users, processing may proceed in the manner described above with reference to FIGS. 1 and 3.

As shown in FIG. 9, the transaction 900 may include transaction details 932, 934, and a smart contract 936. The smart contract 936 may be configured to verify that one or more conditions of the transaction 900 were met at various phases of transaction execution. In the context of FIG. 9, the transaction 900 represents a proposal to update the distributed ledger based on the request to initiate a money transfer transaction received from the first user 910. The transaction 900 may only be committed if the transaction is contractually valid, signed by the correct parties, and does not contain any double-spends (as verified by a node of the money transfer network, such as a notary node). When the first user 910 submits the request to perform a money transfer transaction, a cash state may be pulled from the vault 912, which may propose an update to an owner field. For example, in the money transfer transaction being described and illustrated in FIG. 9, the first user 910 is transferring $10 to the second user. As illustrated at time (t)=0, the first user 910 (e.g., Alice) is the owner of $10 USD held in vault 912. When the cash state is pulled, an owner field update may be proposed to change the owner of the $10 from the first user 910 to the second user 920. In this scenario, the transaction 900 may include transaction details 932 that indicate the first user 910's vault 912 is in the cash state and that the first user 910 is the owner of the $10. The transaction details 932 may also indicate a type of currency associated with the $10, in this example United States dollars. A pay command may be associated with the transaction 900, which may require both the first user 910 and the second user 920 to sign the transaction 900. The transaction details 934 may indicate that the proposed change to the owner of the $10 is the second user 920, the type of currency utilized by the second user 920 (e.g., United States dollars, etc.), and the amount (e.g., $10.00 or another amount if the currency will be converted to a different currency type). The smart contract 936 may verify the cash state of the transaction.

At t=1, the transaction may be validated before the transaction is sent to the second user 920. It is noted that the node that creates a transaction may be considered a "transaction builder" and the transaction builder node may be configured with functionality to validate information going into the transaction, such as to update the transaction details 932 to indicate receipt of payment for the transaction and the like; however, in the example illustrated in FIG. 9 it is assumed that such information (e.g., information regarding receipt of funds for the transaction, etc.) has been received and validated. In an embodiment, the validation of the transaction at t=1 may include executing one or more rules engines against the transaction to verify the transaction does not violate aggregation rules, interdiction rules, or other internal or external compliance checks. Additional examples of transaction verification may include determining whether a party to the transaction is part of a loyalty rewards program (e.g., does a party to the transaction qualify for VIP status, etc.), electronic know your customer (eKYC) processing, risk assessment processing, transaction history analysis, and the like.

As part of the validity determination, information may be provided to the smart contract 936 by one or more nodes of the money transfer network. For example, oracle node 902 may validate certain aspects of the transaction, such as validating the authenticity of "off ledger" information, and may pass validated information to the smart contract 936. Once the information is provided to the smart contract 936, logic of the smart contract 936 may execute one or more rules against the information to verify that the transaction 900 is authorized to proceed to a next step. After the validity is determined at t=1, the first user 910 may sign the transaction 900, as indicated at t=2. Once the transaction had been signed by the first user 910, the transaction may be transmitted to the second user 920, at t=3. Similar validity checks may be performed on the transaction after the transaction is sent to the second user 920, and upon successful validation of the transaction, the transaction may be signed by the second user 920, as indicated at t=4. In an embodiment, the validation of the transaction at t=4 may include executing one or more rules engines against the transaction to verify the transaction does not violate aggregation rules, interdiction rules, or other internal or external compliance checks.

At a time t=5, the transaction, which is now signed by the second user 920, may be returned to the first user 910. At t=6, one or more nodes, such as notary node(s) 904 may validate the transaction. For example, the one or more nodes may verify that the cash state is not historic (e.g., used in a previous transaction) and that the cash state exists in both the vault 912 and the vault 922. If the validation checks performed at t=6 are valid, the one or more nodes may sign the transaction, as indicated at t=7 (illustrating the notary has signed the transaction). After being signed by the one or more nodes at t=7, the cash state in vault 912 may be updated to indicate a historic cash state (e.g., to prevent double spends).

Once the transaction is verified as valid at t=7, the transaction may be written to the distributed ledger at t=8. As shown in FIG. 9, when the transaction is written to the distributed ledger, vault 912 may be updated to reflect a debit of $10 USD (e.g., shown by the entry "Alice, USD, −$10") and vault 922 may be updated to reflect a credit of $10 USD (e.g., shown by the entry "Bob, USD, $10"). It is noted that the illustrated vault entries shown in FIG. 9 have been provided for purposes of illustration, rather than by way of limitation and that information recorded to the vaults associated with different users of a money transfer network in accordance with embodiments may be recorded in a different format than the example provided in FIG. 9. In an embodiment, the transaction may also be transmitted to an observer node 906 at t=8.

As described above, when the transaction is transmitted to the observer node 906, the transaction data may include tokenized identity information, as described above with reference to FIGS. 6-8. By utilizing state information and smart contracts, various checks may be performed during processing of a transaction in an automated manner and immutable records may be created on the distributed ledger, such as by indicating that certain portions of the distributed ledger are historic (e.g., cannot serve as a basis for a current transaction, etc.) while others are non-historic (e.g., could serve as a basis for a current transaction, etc.) It is noted that different transaction types may utilize different smart contracts and that different validation checks may be performed by different nodes of the money transfer network (e.g., due to different regulatory compliance requirements imposed in the different geographic regions across which the nodes of the money transfer network are distributed).

Figure 10:
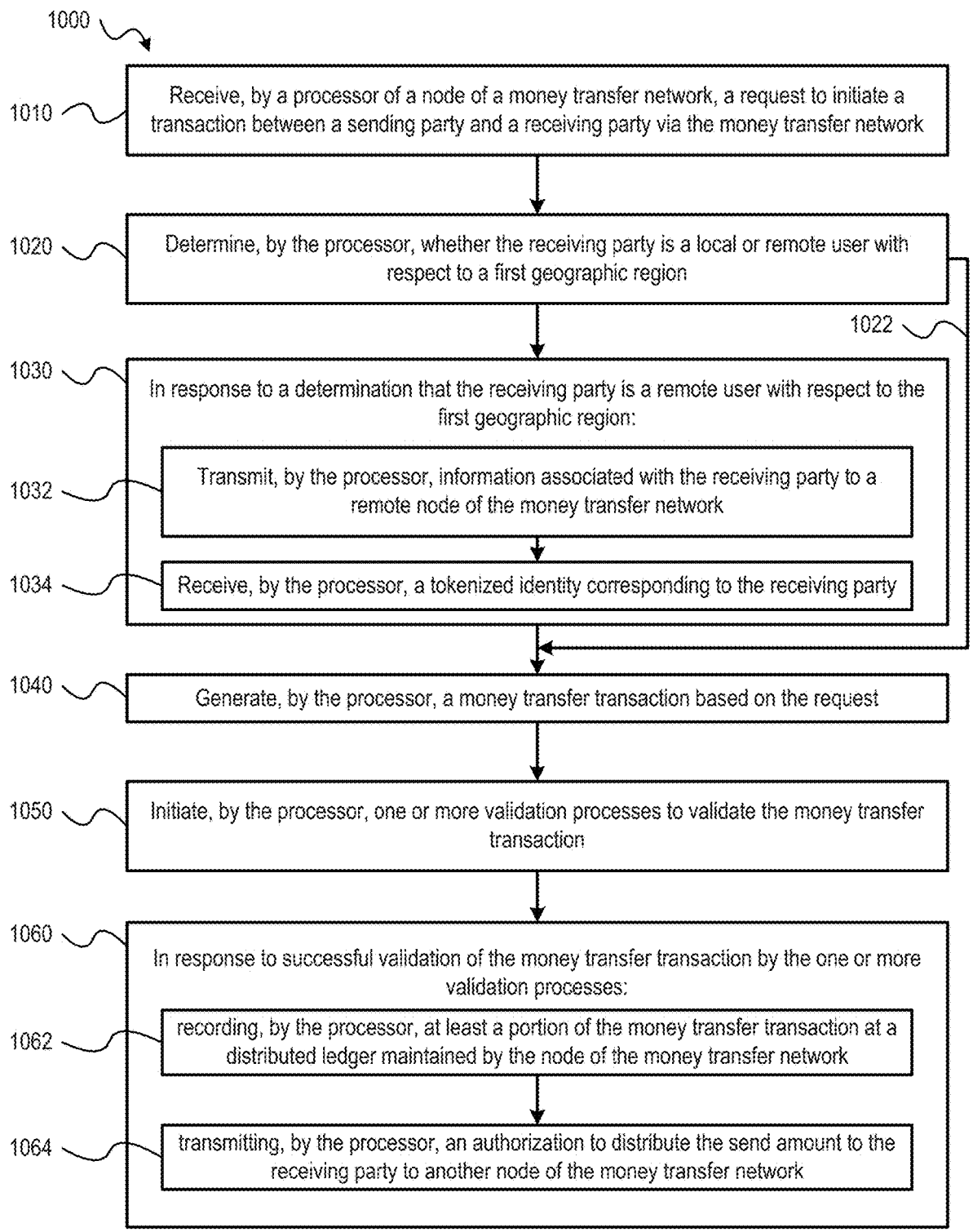
FIG. 10 is a flow diagram of an exemplary method for facilitating a transaction via a money transfer network utilizing a distributed ledger in accordance with embodiments of the present disclosure.

Referring to FIG. 10, a flow diagram of an exemplary method for facilitating a transaction via a money transfer network utilizing a distributed ledger in accordance with embodiments of the present disclosure is shown as a method 1000. In an embodiment, the steps of the method 1000 may be stored as instructions that, when executed by one or more processors, cause the one or more processors to perform the operations of the method in order to facilitate transactions in accordance with embodiments of the present disclosure. In an embodiment, the method 1000 may be performed by nodes (e.g., one or more of the different types of nodes described and illustrated with respect to FIGS. 1-8) of a money transfer network (e.g., the money transfer network 100 of FIG. 1).

As shown in FIG. 10, the method 1000 may include, at step 1010, receiving, by a processor of a node of a money transfer network, a request to initiate a transaction between a sending party and a receiving party via the money transfer network. The node of the money transfer network may be associated with a first geographic region, such as the United States. It is noted that a money transfer network configured in accordance with the method 1000 may include a plurality of geographically distributed nodes, which may include one or more nodes deployed in each of a plurality of geographic regions. Additionally, the geographically distributed nodes of the money transfer network may include different types of nodes, such as transaction nodes (e.g., nodes 110 and 120 of FIG. 1), notary nodes (e.g., notary node 130 of FIG. 1), observer nodes (e.g., observer node 140 of FIG. 1), and oracle nodes (e.g., oracle node 150 of FIG. 1). Where the money transfer network includes oracle nodes, the oracle nodes may be configured to obtain information (e.g., currency exchange rates or other data) from one or more data sources (e.g., data sources 170 of FIG. 1), which may include internal data sources (e.g., data sources maintained by the entity that operates the money transfer network) and external data sources (e.g., data sources provided by third parties with respect to the entity that operates the money transfer network). In an aspect, step 1010 of the method 1000 may be performed by a transaction node and the request may be received in response to interaction between the sending party and an application (e.g., the application(s) described above with reference to FIG. 1) provided by the entity that operates the money transfer network.

At step 1020, the method includes determining, by the processor, whether the receiving party is a local or remote user with respect to the first geographic region. In an embodiment, the determination of whether the receiving party is a local or remote/foreign user may be determined in the manner described above with reference to FIG. 1. If the receiving party is a local user, the method 1000 may proceed to step 1040, as indicated by line 1022. If the receiving party is determined to be a remote user, the method 1000 may proceed to block 1030. As shown in block 1030, when the receiving party is determined to be a remote user with respect to a geographic location of the node that received the request, the method 1000 includes, at step 1032, transmitting, by the processor, information associated with the receiving party to a remote node of the money transfer network. As explained above with respect to FIGS. 1 and 3, the remote node may correspond to a local node with respect to a location associated with the receiving party, and the remote node may be determined based on information included in the request. At step 1034, the method 1000 may include receiving, by the processor, a tokenized identity corresponding to the receiving party. As described above with reference to FIGS. 1-8, transaction data may be stored in a decoupled manner with respect to user data (e.g., PII data). That is, user data may be maintained in a database accessible only by local nodes (e.g., nodes within the same geographic region as the database) and transaction data may be stored on a distributed ledger maintained by the nodes of the money transfer network. When transactions are written to the distributed ledger, participants to the transaction may be identified using tokenized identity information, rather than PII data, thereby minimizing burdens associated with certain regulatory compliance requirements and mitigating potential distribution of PII data to improper users or systems.

At step 1040, the method 1000 includes generating, by the processor, a money transfer transaction based on the request. As explained above with reference to FIGS. 1 and 3-8, the money transfer transaction data may include a tokenized identity of the sending party, the tokenized identity of the receiving party, and a send amount corresponding to an amount of funds to be provided to the receiving party in connection with the money transfer transaction. Additionally, the transaction data may include a transaction identifier, one or more timestamps, status information, or other types of transaction data, as described above with reference to FIGS. 6-8. At step 1050, the method 1000 includes initiating, by the processor, one or more validation processes to validate the money transfer transaction. As described above, the node that received the request may include one or more rules engines configured to execute various operations to verify the requested transaction satisfies various regulations imposed by the entity that operates the money transfer network and regulations imposed by external entities, such as government agencies and the like. Additionally, the one or more validation processes may include transmitting the transaction data to one or more remote nodes, such as the remote node identified in step 1032. Where the one or more validation operations initiated by the node include transmission of the transaction data to a remote node, the method 1000 may include receiving result data corresponding to a validation outcome determined by the remote node(s). If the one or more validation processes are not successful (e.g., the transaction is not authorized for execution), the method 1000 may include cancelling the transaction or placing a hold on the transaction, as described above with reference to FIGS. 6 and 8. For such transactions, a user of the money transfer network may view the transaction to determine whether the reasons for the failed state of the transaction can be remedied (e.g., a party to the transaction was mistakenly identified as included on an interdiction list, the send amount can be reduced to satisfy one or more aggregation checks, etc.), and if remedied, the transaction status may be updated to successful and allowed to proceed with execution. If the one or more validation processes are successful (e.g., the transaction is authorized for execution), the method 1000 may proceed to block 1060.

As shown in block 1060, in response to successful validation of the money transfer transaction by the one or more validation processes, the method 1000 may include, at step 1062, recording, by the processor, at least a portion of the money transfer transaction at a distributed ledger maintained by the node of the money transfer network and at step 1064, transmitting, by the processor, an authorization to distribute the send amount to the receiving party to another node of the money transfer network. As explained above, in step 1062, the node that received the request may record the transaction to a portion of the distributed ledger maintained by that node. Other nodes of the money transfer network may also update portions of the distributed ledger, such as the remote node associated with the geographic location of the receiving party. As described above with reference to FIG. 9, updating the ledger may include recording information to a vault associated with the sending party and a vault associated with the receiving party. The vault associated with the sending party may be updated by the node that received the request and the vault associated with the receiving party may be updated by the remote node. In an embodiment, the remote node may update the vault of the sending party in response to receiving the authorization transmitted in step 1064.

It is noted that although FIGS. 1-10 have described aspects of implementing money transfer transactions via a money transfer network, the concepts disclosed herein may be readily applied to other types of transactions. For example, the money transfer network 100 illustrated in FIG. 1, as well as the various aspects of operating the money transfer network 100, as described with reference to FIGS. 2-10, may be utilized to provide distribution of loan funds and/or repayment of loans. For example, a loan may be established using a smart contract and money transfer transactions may be utilized to repay the loan (e.g., the sending party may take out a loan and the receiving party may be the entity that provided the loan to the sending party). Additional exemplary aspects of distributing loan funds and repaying loan funds using money transfer transactions via a money transfer network are described in co-pending and commonly owned U.S. patent application Ser. No. 14/801, 504, filed Jul. 16, 2015, and entitled "SYSTEMS AND METHODS FOR UTILIZING A MONEY TRANSFER NETWORK TO FACILITATE LENDING," the contents of which are expressly incorporated herein by reference. As another example to which the concepts herein may be applied, money transfer facilitated in accordance with embodiments of the present disclosure may also be utilized to pay for bills, such as to allow a money transfer transaction to be initiated to pay for goods or services purchased by the sending party and where the receiving party is the entity that sells or provides the goods or services being purchased. Such additional functionalities may extend the availability of certain types of services, such as loan services, to new markets (e.g., markets where banks or other financial entities do not have a sufficient presence or where it is otherwise difficult for certain individuals to obtain services from such entities).

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A computer-implemented method for facilitating a transaction between a local transaction node and a remote transaction node of a money transfer network having a plurality of geographically distributed nodes which utilize a distributed ledger, the method comprising:
   receiving, by a processor of the local transaction node a request to initiate a transaction between a sending party and a receiving party via the money transfer network, wherein the local transaction node of the money transfer network is associated with the sending party and a first geographic region;
   determining, by the processor, whether the receiving party is associated with a second geographical region;
   in response to a determination that the receiving party is associated with the second geographic region:
   transmitting, by the processor, information associated with the receiving party to a remote transaction node associated with the second geographical region corresponding to a location of the receiving party; and
   receiving, by the processor, a tokenized identity corresponding to the receiving party;
   generating, by the processor, a money transfer transaction based on the request, wherein the money transfer transaction comprises a tokenized identity of the sending party, the tokenized identity of the receiving party, and a send amount corresponding to an amount of funds to be provided to the receiving party in connection with the transaction;
   transmitting, by the processor, transaction data associated with the money transfer transaction to a notary node of the money transfer network, the notary node configured to validate at least a portion of the transaction data;
   receiving, by the processor, validation information from the notary node, wherein the validation information indicates an outcome of the validation performed by the notary node; and
   in response to successful validation of the money transfer transaction by the one or more validation processes:
   recording, by the processor, at least a portion of the transaction at the distributed ledger maintained by nodes of the money transfer network;
   storing, by the processor, user data of the sending party in a first database accessible only by nodes within the same geographic region as the local transaction node;
   storing user data of the receiving party in a second database accessible only by nodes within the same geographic region as the remote transaction node; and
   transmitting, by the processor, an authorization to distribute the send amount to the remote transaction node of the money transfer network.

2. The computer-implemented method of claim 1, wherein the user data comprises personally identifiable information.

3. The computer-implemented method of claim 1, wherein the notary node executes one or more rules engines against transaction data associated with the money transfer transaction to determine whether the transaction data satisfies one or more sets of transaction criteria.

4. The computer-implemented method of claim 3, wherein the one or more rules engines comprises at least one of an aggregation rules engine and an interdiction rules engine, wherein the aggregation rules engine is associated with a first set of transaction criteria associated with aggregation of transactions and the interdiction rules engine is associated with a second set of transaction criteria specifying users that are prohibited from participating in transactions via the money transfer network.

5. The computer-implemented method of claim 1, wherein the notary node determines whether the transaction data satisfies one or more regulatory requirements associated with a geographic region corresponding to the remote transaction node.

6. The computer-implemented method of claim 1, further comprising transmitting, by the processor, transaction data representative of the money transfer transaction to an observer node of the money transfer network.

7. The computer-implemented method of claim 6, wherein the observer node is located in the first geographic region.

8. The computer-implemented method of claim 6, wherein the observer node is located in a third geographic region that is different from the first geographic region and a second geographic region corresponding to the location of the remote node.

9. The computer-implemented method of claim 1, further comprising: receiving, by the processor, an audit request, wherein the audit request is configured to verify compliance with one or more regulatory requirements imposed on the money transfer network; and generating, by the processor, one or more audit reports in response to the request.

10. The computer-implemented method of claim 1, further comprising displaying historical transaction data at a graphical user interface, wherein the historical transaction data comprises information that identifies: one or more geographic regions served by the money transfer network, transaction amount data corresponding to each of the one or more geographic regions, transaction summary information associated with a status of transactions executed in the one or more geographic regions, and a log of transactions executed in the one or more geographic regions, wherein the transaction amount data indicates an amount of funds transferred into each of the one or more geographic regions over at least one period of time and an amount of funds transferred from each of the one or more geographic regions over the at least one period of time, wherein the transaction summary information indicates metrics representative of successful transactions and failed transactions within the one or more geographic regions, and wherein the log of transactions provides a list of the transactions executed in the one or more geographic regions.

11. The computer-implemented method of claim 10, wherein the historical transaction data is received from an observer node of the money transfer network, and wherein the log of transactions comprises tokenized identity information for each participant to a transaction included in the log of transactions.

12. A computer-implemented system comprising:
   a money transfer network including a distributed ledger distributed across a plurality of nodes located in a plurality of geographic regions;

a local transaction node physically located within a first geographic region as a sending party, the local transaction node comprising a processor and a memory having instructions that when executed cause the processor to perform a method comprising:
receiving a request to initiate a transaction between a sending party and a receiving party via the money transfer network, wherein the local transaction node of the money transfer network is associated with the sending party and a first geographic region;
determining whether the receiving party is associated with a second geographical region:
in response to a determination that the receiving party is associated with the second geographic region:
transmitting information associated with the receiving party to a remote transaction node associated with the second geographical region corresponding to a location of the receiving party; and
receiving a tokenized identity corresponding to the receiving party;
generating a money transfer transaction based on the request, wherein the money transfer transaction comprises a tokenized identity of the sending party, the tokenized identity of the receiving party, and a send amount corresponding to an amount of funds to be provided to the receiving party in connection with the transaction;
transmitting transaction data associated with the money transfer transaction to a notary node of the money transfer network, the notary node configured to validate at least a portion of the transaction data;
receiving validation information from the notary node, wherein the validation information indicates an outcome of the validation performed by the notary node; and
in response to successful validation of the money transfer transaction by the one or more validation processes;
recording at least a portion of the transaction at the distributed ledger maintained by nodes of the money transfer network;
storing user data of the sending party in a first database accessible only by nodes within the same geographic region as the local transaction node;
storing user data of the receiving party in a second database accessible only by nodes within the same geographic region as the remote transaction node; and
transmitting an authorization to distribute the send amount to the remote transaction node of the money transfer network.

13. The system of claim 12, wherein the user data comprises personally identifiable information.

14. The system of claim 12, wherein the notary node executes one or more rules engines against transaction data associated with the money transfer transaction to determine whether the transaction data satisfies one or more sets of transaction criteria.

15. The system of claim 14, wherein the one or more rules engines comprises at least one of an aggregation rules engine and an interdiction rules engine, wherein the aggregation rules engine is associated with a first set of transaction criteria associated with aggregation of transactions and the interdiction rules engine is associated with a second set of transaction criteria specifying users that are prohibited from participating in transactions via the money transfer network.

16. The system of claim 12, wherein the notary node determines whether the transaction data satisfies one or more regulatory requirements associated with a geographic region corresponding to the remote transaction node.

17. The system of claim 12, wherein the method further comprises transmitting transaction data representative of the money transfer transaction to an observer node of the money transfer network.

18. The system of claim 17, wherein the observer node is located in the first geographic region.

19. The system of claim 17, wherein the observer node is located in a third geographic region that is different from the first geographic region and a second geographic region corresponding to the location of the remote node.

20. The system of claim 12, wherein the method further comprises: receiving an audit request, wherein the audit request is configured to verify compliance with one or more regulatory requirements imposed on the money transfer network; and generating one or more audit reports in response to the request.

21. The system of claim 12, wherein the method further comprises displaying historical transaction data at a graphical user interface, wherein the historical transaction data comprises information that identifies: one or more geographic regions served by the money transfer network, transaction amount data corresponding to each of the one or more geographic regions, transaction summary information associated with a status of transactions executed in the one or more geographic regions, and a log of transactions executed in the one or more geographic regions, wherein the transaction amount data indicates an amount of funds transferred into each of the one or more geographic regions over at least one period of time and an amount of funds transferred from each of the one or more geographic regions over the at least one period of time, wherein the transaction summary information indicates metrics representative of successful transactions and failed transactions within the one or more geographic regions, and wherein the log of transactions provides a list of the transactions executed in the one or more geographic regions.

22. The system of claim 21, wherein the historical transaction data is received from an observer node of the money transfer network, and wherein the log of transactions comprises tokenized identity information for each participant to a transaction included in the log of transactions.

* * * * *